US008819313B1

(12) United States Patent
Walther et al.

(10) Patent No.: US 8,819,313 B1
(45) Date of Patent: Aug. 26, 2014

(54) TRAFFIC MANAGEMENT SYSTEM

(71) Applicant: Superior Traffic Systems, LLC, Missoula, MT (US)

(72) Inventors: Jonathan Y. Walther, Missoula, MT (US); Jeffery M. Hollenback, Missoula, MT (US)

(73) Assignee: Superior Traffic Systems, LLC, Missoula, MT (US)

( * ) Notice: Subject to any disclaimer, the term of this patent is extended or adjusted under 35 U.S.C. 154(b) by 0 days.

(21) Appl. No.: 13/945,999

(22) Filed: Jul. 19, 2013

(51) Int. Cl.

| | |
|---|---|
| ***G06F 13/12*** | (2006.01) |
| ***G06F 13/38*** | (2006.01) |
| ***G06F 13/00*** | (2006.01) |
| ***G08G 1/097*** | (2006.01) |
| ***G08G 1/0955*** | (2006.01) |
| ***G08G 1/081*** | (2006.01) |

(52) U.S. Cl.
CPC ................ *G08G 1/081* (2013.01); *G08G 1/097* (2013.01); *G08G 1/0955* (2013.01)
USPC ............... 710/64; 710/62; 710/100; 709/208; 709/209; 709/223; 709/224; 709/225

(58) Field of Classification Search
None
See application file for complete search history.

(56) References Cited

U.S. PATENT DOCUMENTS

| | | | |
|---|---|---|---|
| 3,729,706 A | 4/1973 | Hein | |
| 4,857,921 A | 8/1989 | McBride et al. | |
| 6,064,318 A | 5/2000 | Kirchner, III et al. | |
| 6,118,388 A | 9/2000 | Morrison | |
| 6,236,933 B1 * | 5/2001 | Lang | 701/117 |
| 6,804,524 B1 * | 10/2004 | Vandermeijden | 455/456.1 |
| 7,333,029 B2 | 2/2008 | Hammett | |
| 7,593,999 B2 * | 9/2009 | Nathanson | 709/217 |
| 7,633,408 B2 | 12/2009 | Yingst et al. | |
| 7,973,676 B2 | 7/2011 | Meshkin et al. | |
| 8,319,662 B1 | 11/2012 | Bontemps et al. | |
| 8,576,069 B2 * | 11/2013 | Nadeem et al. | 340/539.25 |
| 2006/0197683 A1 | 9/2006 | Hammett | |
| 2008/0198038 A1 | 8/2008 | Yingst et al. | |
| 2008/0303695 A1 | 12/2008 | Meshkin et al. | |
| 2008/0316055 A1 * | 12/2008 | Bachelder et al. | 340/906 |
| 2010/0070128 A1 * | 3/2010 | Johnson | 701/33 |
| 2011/0095908 A1 * | 4/2011 | Nadeem et al. | 340/905 |
| 2012/0022776 A1 * | 1/2012 | Razavilar | 701/200 |
| 2013/0063282 A1 * | 3/2013 | Baldwin et al. | 340/941 |

* cited by examiner

*Primary Examiner* — Michael Sun
(74) *Attorney, Agent, or Firm* — Antoinette M. Tease

(57) ABSTRACT

A real-time traffic management system comprising a main light controller module configured to monitor and control functionality of one or more traffic lights, a master control unit server software application, a network operations control module, and a network watcher application program. The main light controller module communicates with one or more coordinating light controller modules, onsite personnel, and a network operations center. The main light controller uses a camera that detects instances of vehicle demand and provides live images for situational awareness. The main light controller module comprises a global positioning satellite receiver and a light sensor for monitoring ambient lighting conditions. The network watcher application program continuously scans incoming data, monitors performance of all components in the system, and issues alerts and alarms to notify personnel of events or conditions outside of established tolerances.

13 Claims, 23 Drawing Sheets

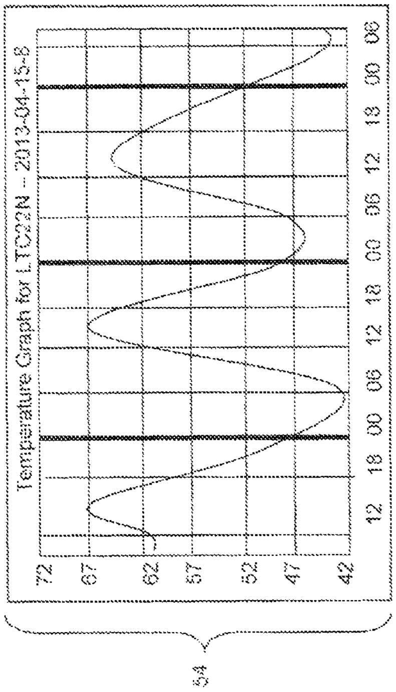
FIGURE 22B
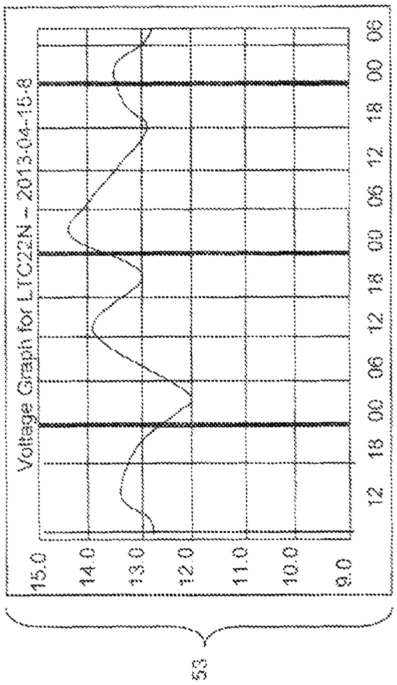
FIGURE 22A
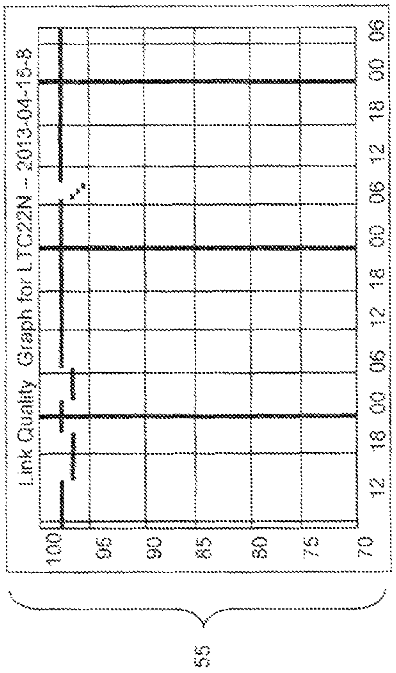
FIGURE 22C
FIGURE 22

TRAFFIC MANAGEMENT SYSTEM

BACKGROUND OF THE INVENTION

1. Field of the Invention

The present invention relates generally to the field of traffic management systems, and more specifically, to a real-time traffic management system for portable or temporary traffic signals that allows the user to program and monitor groups of portable traffic signal systems in real time over the Internet.

2. Description of the Related Art

At present, there are no commercially available products that allow for the remote and local monitoring and control of groups of mobile traffic lights, including demand-based sequencing. Examples of prior art traffic management systems include: U.S. Pat. No. 3,729,706 (Hein, 1973); U.S. Pat. No. 4,857,921 (McBride et al., 1989); U.S. Pat. No. 6,064,318 (Kirchner, III et al., 2000); U.S. Pat. No. 7,333,029 (Hammett, 2008): U.S. Pat. No. 7,633,408 (Yingst et al., 2009); U.S. Pat. No. 7,973,676 (Meshkin et al. 2011); and U.S. Pat. No. 8,319,662 (Bontemps et al. 2012). None of these systems incorporates the functions and features of the present invention, as described more fully below.

BRIEF SUMMARY OF THE INVENTION

The present invention is a real-time traffic management system comprising: a main light controller module configured to monitor and control functionality of one or more traffic lights, each traffic light comprising a signal head pointing in a direction; a master control unit server software application that runs on the main light controller module; a network operations control module that is in communication with the main light controller module; and a network watcher application program; wherein the main light controller module is configured to communicate with one or more coordinating light controller modules, onsite personnel, and a network operations center; wherein the main light controller module uses a camera that detects instances of vehicle demand and provides live images for situational awareness; wherein the main light controller module comprises a global positioning satellite receiver; wherein the main light controller module further comprises a light sensor for monitoring ambient lighting conditions; and wherein the network watcher application program continuously scans incoming data, monitors performance of all components in the system, and issues alerts and alarms to notify personnel of events or conditions outside of established tolerances.

In a preferred embodiment, the main light controller module communicates with the one or more coordinating light controller modules using two or more radios operating on two or more non-overlapping radio frequency hands. Preferably, the main light controller module further comprises dimmer circuitry for dimming traffic signals based on ambient lighting conditions. The main light controller module preferably further comprises a compass for determining the direction in which the signal head on each traffic signal is pointing.

In a preferred embodiment, the main light controller module receives commands from and reports status to an archiving proxy server at the network operations center. Preferably, the archiving proxy server actively requests status and images from the main light controller module, receives responses from the main light controller, and archives the responses for immediate and long-term retrieval. The archiving proxy server preferably responds to status and image requests from authorized administrative users via administrative displays, status and image requests from client users via client displays, and status and image requests from public users via public displays.

In a preferred embodiment, the archiving proxy server relays commands from authorized users to the main light controller module to provide secure monitor and control access to intersections from any location. Preferably, the invention further comprises an archiving proxy server consolidated summary application that allows a user to monitor multiple intersections simultaneously. The camera preferably records images for retrieval by the archiving proxy server and authorized users and detects motion events and reports the motion events to the master control unit server software application.

In a preferred embodiment, the master control unit server software application responds to commands from the archiving proxy server and from authorized remote users. Preferably, the main light controller module uses timing information derived from a global positioning satellite signal to synchronize flasher mode phase transitions to an atomic clock, thereby synchronizing flasher mode phase transitions of all traffic signals controlled by the main light controller module. The main light controller module preferably has a standard operating mode, a flasher operating mode and a pilot car operating mode.

BRIEF DESCRIPTION OF THE DRAWINGS

FIG. 38 is a diagram of a sample deployment scenario for the present invention involving a three-way intersection.

FIG. 22A is a first sample strip chart display generated by the archiving proxy server software.

FIG. 22B is a second sample strip chart display generated by the archiving proxy server software.

FIG. 22C is a third sample strip chart display generated by the archiving proxy server software.

DETAILED DESCRIPTION OF INVENTION

A. Overview

The present invention is a real-time traffic management system for portable or temporary traffic signals that allows the user to program and monitor groups of portable traffic signal systems in real time over the Internet. Once the light controller (LTC) module is installed on a portable traffic signal, the network operations control (NOC) module, which is at a fixed geographic location, is able to establish communications with the control module, verify that all equipment is working properly, and program the system to control traffic according to the desired program. Through the use of live video feeds of the traffic approaching each signal, the control center is able to establish vehicle demand detection locations for each lane that the signals are controlling and utilize these vehicle arrival events as part of the program. The live video also allows our control center to monitor the traffic approaching each signal to verify that the program is efficiently handling traffic flows and to provide remote situational awareness of system operation.

The ability to detect vehicle arrival events in multiple lanes of traffic in the same direction (left turn, through traffic and right turn) and to program and control each lane on separate phases gives the system the flexibility and ability to be used in complex applications not previously possible with temporary signal systems. Live adjustments can be made to the program to improve the efficiency of the traffic flow or to manually control each signal if needed in the event of an emergency. All data arriving at the control center, including text status data and images (both still images and videos, is permanently archived for both immediate real-time retrieval and also after-the-fact review. (As used herein, the term “images” includes both still images and videos.) At the same time, the network watcher application program continuously scans the incoming data, monitoring the performance of all the components of the system, and issues alerts and alarms to notify control center personnel and to update their displays, as well as to notify designated project personnel should any events or conditions occur that are outside established tolerances.

The present invention provides for remote control of traffic intersection without the need for a continuous onsite presence of personnel such as flaggers. Instead, the present invention requires minimally trained onsite personnel only during the setup and tear-down activities and whenever direct intervention is required. The functionality and features of the present invention are described more fully below with reference to the figures.

B. Detailed Description of the Figures

Figure 1:
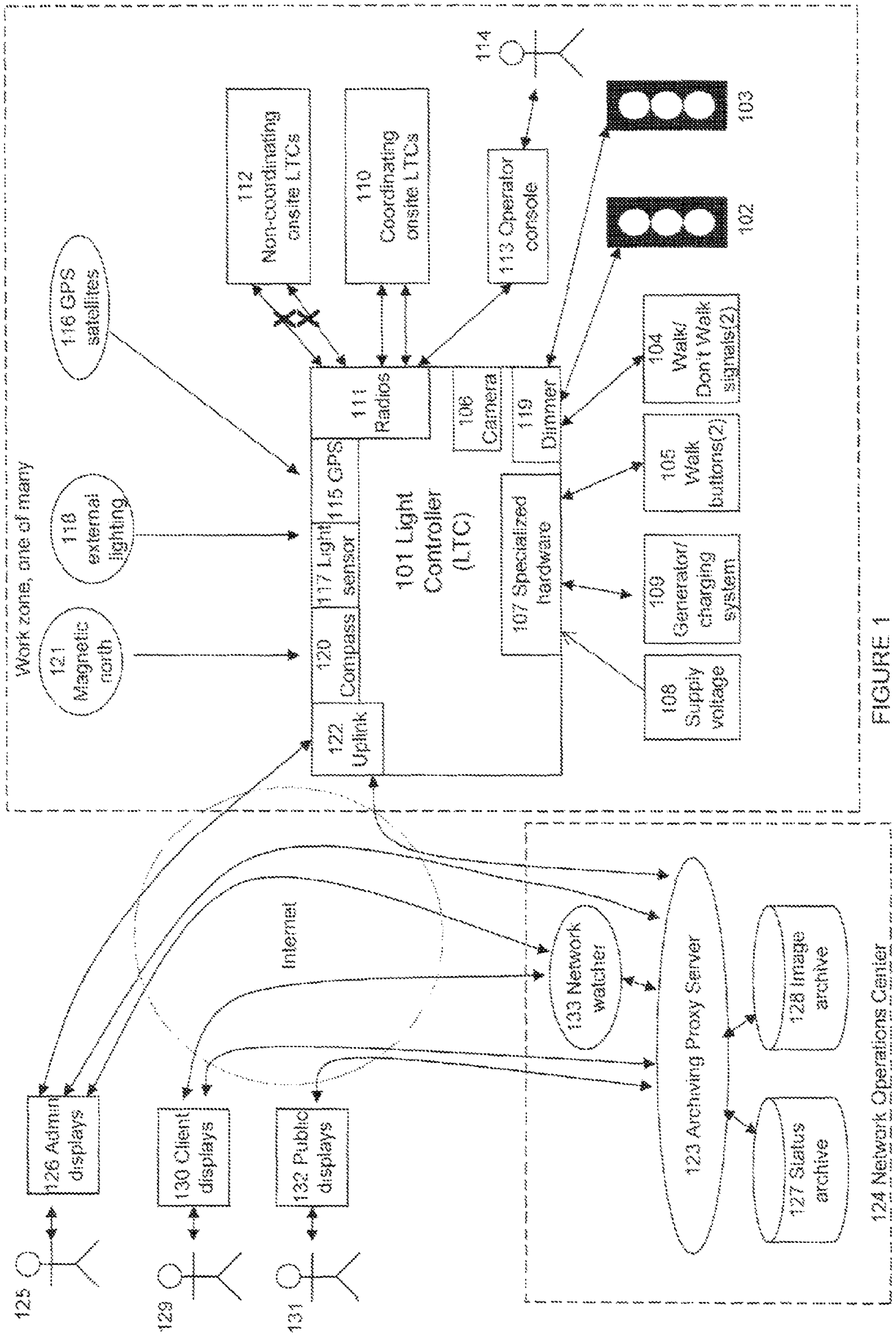
FIG. 1 is a diagram of the system architecture of the present invention.

FIG. 1 is a system architecture diagram for the invention. The light controller (LTC) 101 is a computer-based controller module capable of monitoring and controlling the functions of typical traffic light, as well as communicating with other LTCs 110, onsite personnel 114, and the network operations center (NOC) 124. The LTC can control the individual signal lamps comprising two or more independent traffic signal heads 102, 103, two or more walk/don’t walk signals 104, and two or more walk buttons 105. The LTC uses a camera 106 pointed in the direction of traffic approaching the signal to detect instances of vehicle demand and also to provide images used for situational awareness. (Note that the camera 106 is either integral to the LTC hardware or a separate hardware component that connects to the LTC.) The LTC has specialized circuitry (hardware) 107 that is capable of monitoring its supply voltage 108, and the LTC uses this information to control an attached generator/charging system 109.

The LTC can communicate with one or more similarly configured coordinating LTCs 110 in the vicinity using two or more radios 111 operating on two or more non-overlapping radio frequency bands. The LTC does not communicate (nor attempt to communicate) with other non-coordinating LTCs 112 in the vicinity (e.g., those operating at different intersections or under different ownership). The LTC communicates wirelessly via an operator’s console 113 with onsite field service personnel 114, providing a secure monitor and control interface to authorized personnel. The LTC monitors its location through the use of a global positioning satellite (GPS) receiver 115 and attendant GPS satellites 116. The LTC uses a light sensor 117 to monitor the ambient lighting conditions 118 and uses this information to optionally dim the traffic signals lamps under its control using its dimmer circuitry 119. The LTC uses a compass 120 to detect the direction to magnetic north 121 to determine the direction in which the traffic signal head is pointing. LTC is also capable of maintaining an uplink to the Internet 122 through a variety of common methods, including a cellular network, local wireless access such as WiFi, and a traditional wired Internet connection. The LTC uses the uplink primarily to receive commands from and report status to the archiving proxy server (APS) 123 at the NOC 124 but will also provide similar access to other authorized remote users 125 via the administrative displays 126 for redundancy in the event of the loss of the NOC 124. The APS 123 is preferably fixed in place onsite and not mobile (it has a reliable connection to the Internet).

The NOC is a set of computers, software, displays, and personnel that continuously monitors the operation of all LTCs. The APS actively requests status from each Master Control Unit (MCU) and pictures from each camera and archives all responses for immediate and long-term retrieval in either the status or image archives 127 and 128. It also responds to indirect status and image requests from authorized administrative users 125 via administrative displays 126 just as if those users were directly connected to the LTC; similar requests from client users 129 via client displays 130; and similar requests from public users 131 via the public displays 132. The APS also acts to relay commands from authorized users to LTCs in the field, providing secure monitor and control access to the intersections from anywhere in the world.

The network watcher 133 monitors the stream of data flowing from the LTCs to the APS, looking for out-of-tolerance conditions (e.g., low voltage or radio link quality issues). When such conditions are detected, the network watcher sends notifications either via email or text message to the set of address on a preconfigured list. The network watcher also maintains a series of graphs showing system parameter values (e.g., line voltage or radio link quality) in the recent past.

Figure 2:
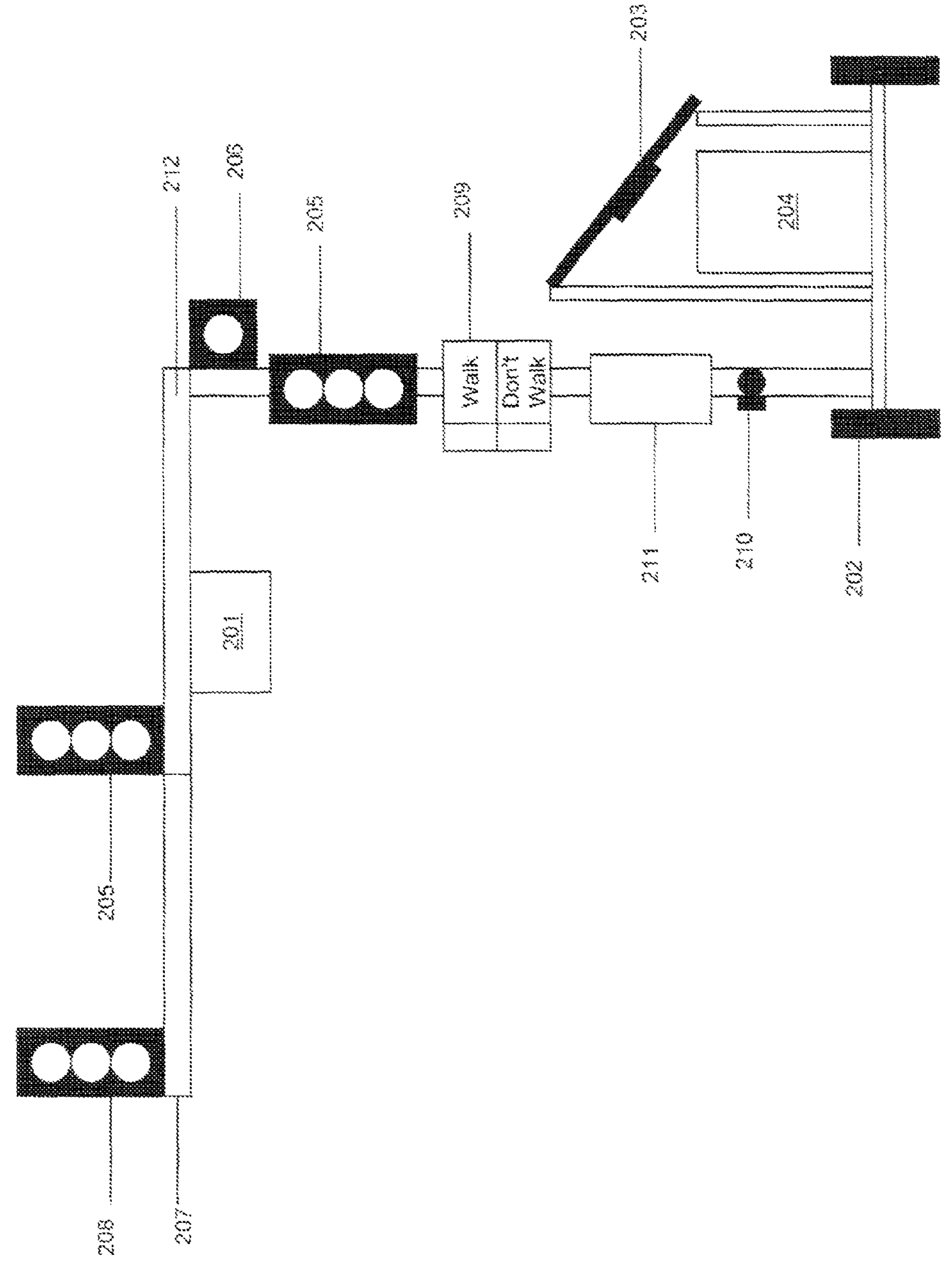
FIG. 2 is a diagram of a typical installation of the onsite components of the present invention and other hardware to which they are connected.

FIG. 2 is a diagram showing the LTC 201 in the environment in which it operates in the work zone. A signal trailer upon which the LTC is mounted typically comprises: wheels and, or stabilizers 202 to provide a stable horizontal platform; a solar charging system 203, batteries and an optional generator and charging system 204; an arm 212 to support two standard signal heads 205; an optional monitor lamp 206; an optional left turn arm 207 and signal head 208; one or two optional walk/don't walk signals 209 to control pedestrian traffic with and against the flow of traffic; one or two optional walk buttons 210 to indicate pedestrian demand with and against the flow of traffic; and storage and a power supply for the operator's console 211. The electrical system powers the LTC, while the LTC conditionally supplies dimmed power to all lamps and signals, accepts inputs from the optional walk buttons, and optionally controls the generator and associated charging system.

The LTC's camera records images for retrieval by the APS or other authorized users. It also detects motion events and reports them to the MCU. The GPS device provides location and timing information and compass records the azimuthal direction in which the signal head is pointing. Multiple radios on at least two different unlicensed radio bands are used to provide redundant communication routes in case of adverse environmental conditions or equipment failure. The MCU runs on the LTC 101, which coordinates the activities of its own signal hardware as well as that of other LTCs and, where Internet connectivity is available, responds to commands from the APS and authorized remote users.

Figure 3B:
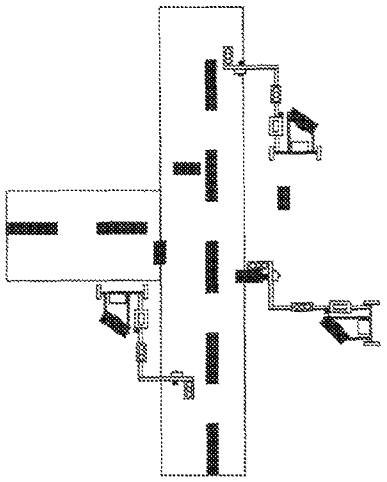
FIG. 3A is a diagram of a sample deployment scenario for the present invention involving a one-lane closure.
FIG. 3C is a diagram of a sample deployment scenario for the present invention involving a four-way intersection.
FIG. 3D is a diagram of a sample deployment scenario for the present invention involving a four-way intersection with four left turn bays.
Figure 3D:
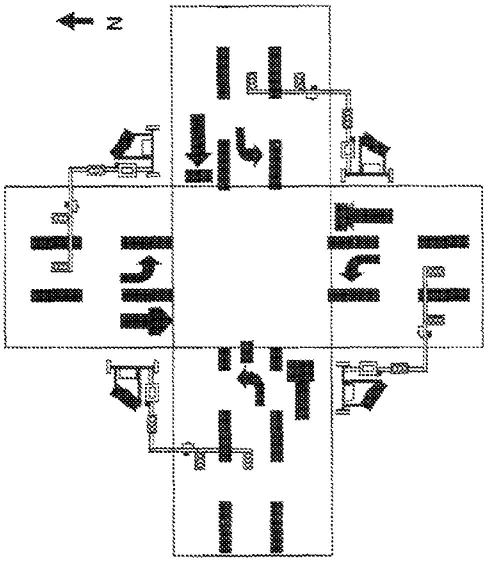
Figure 3A:
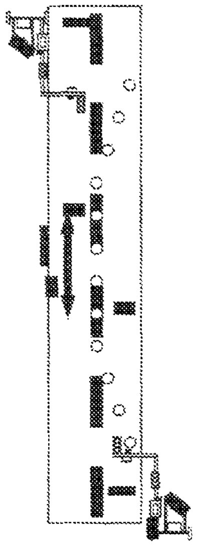
Figure 3C:
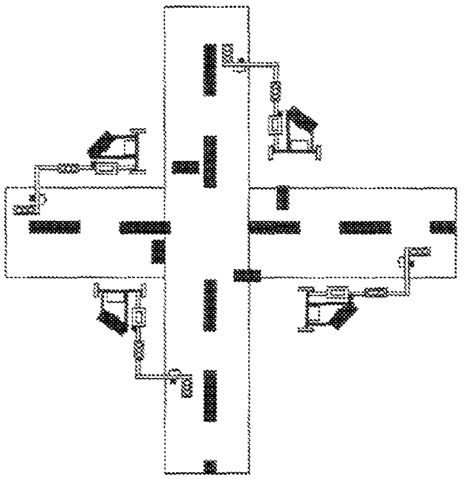

FIGS. 3A-3D depict four sample scenarios, among many others, in which traffic signals equipped as in FIG. 2 might be deployed to control traffic in a safe and effective manner and to also provide for remote monitor and control. The lane closure scenario in FIG. 3A shows how two traffic signals equipped with the invention can be used to control two-way access to a single lane of traffic (to be configured as two phases, with one signal on each phase). The three-way intersection scenario in FIG. 3B shows how three traffic signals equipped with the invention can be used to control three-way intersections (two phases, with the eastbound and westbound signals on the main phase, and the remaining southbound signal on a second phase). The four-way intersection scenario in FIG. 3C shows how four traffic signals equipped with the invention can be used to control four-way intersections (two phases, with two signals on each phase). The four-way) intersection with four left turn bays scenario in FIG. 3D shows how four signals equipped with the optional left turn signal arms and heads can be used to control traffic at such an intersection, where the phases can be defined in a number of ways (e.g., with a north-south phase, an east-west phase, and two separate left turn phases, or with a north-south phase, a north-south left turn phase, an eastbound phase with protected left turn, and a westbound phase with protected left turn).

In addition to the pictured scenarios, other scenarios—such as for pilot car operations or for crosswalk applications—are possible because the system can support an essentially unlimited number of LTCs on a given site, organized in an unlimited number of phases, with an unlimited number of signals per phase.

Figure 4:
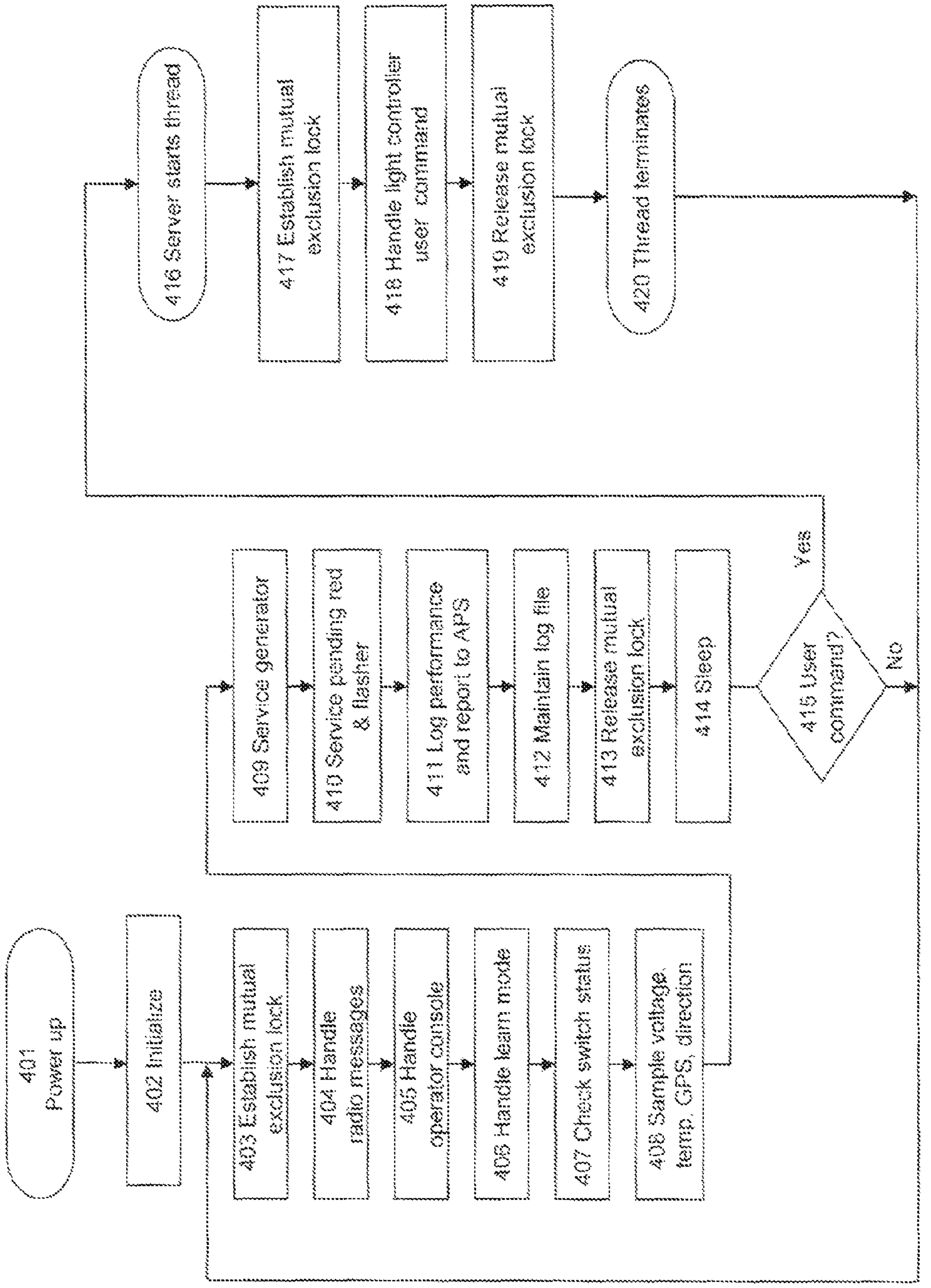
FIG. 4 is a flow diagram of the components of the light controller server software.

FIG. 4 is a flow chart of the application functions within the LTC server. The LTC server is a control application with a web server interface, allowing it to both accept commands from and return responses to user applications via a network connection while performing its control function in the background. The mainline of the LTC server is organized as a loop that repeats for as long as the computer remains in operation and is depicted on the left in this figure. In response to a network user command, the server portion of the software spawns separate threads to service them as depicted on the right in this figure.

At power up 401, the various electrical components of the LTC power themselves up, and the LTC computer's operating system bootstraps itself into operation and eventually starts up the LTC server. After startup, the server initializes itself 402 by reading its configuration file to determine the details of its installation (e.g., whether a left turn signal head is present, whether a generator is present, the identification of the 'learned' handheld remote control, if any), determines the unique LTC identifier, establishes communication with the operator console, establishes communication with the radio modem hardware, if so configured, and registers with the server software to be notified of certain web-based addresses that form the basis of the LTC's network interface.

Figure 5:
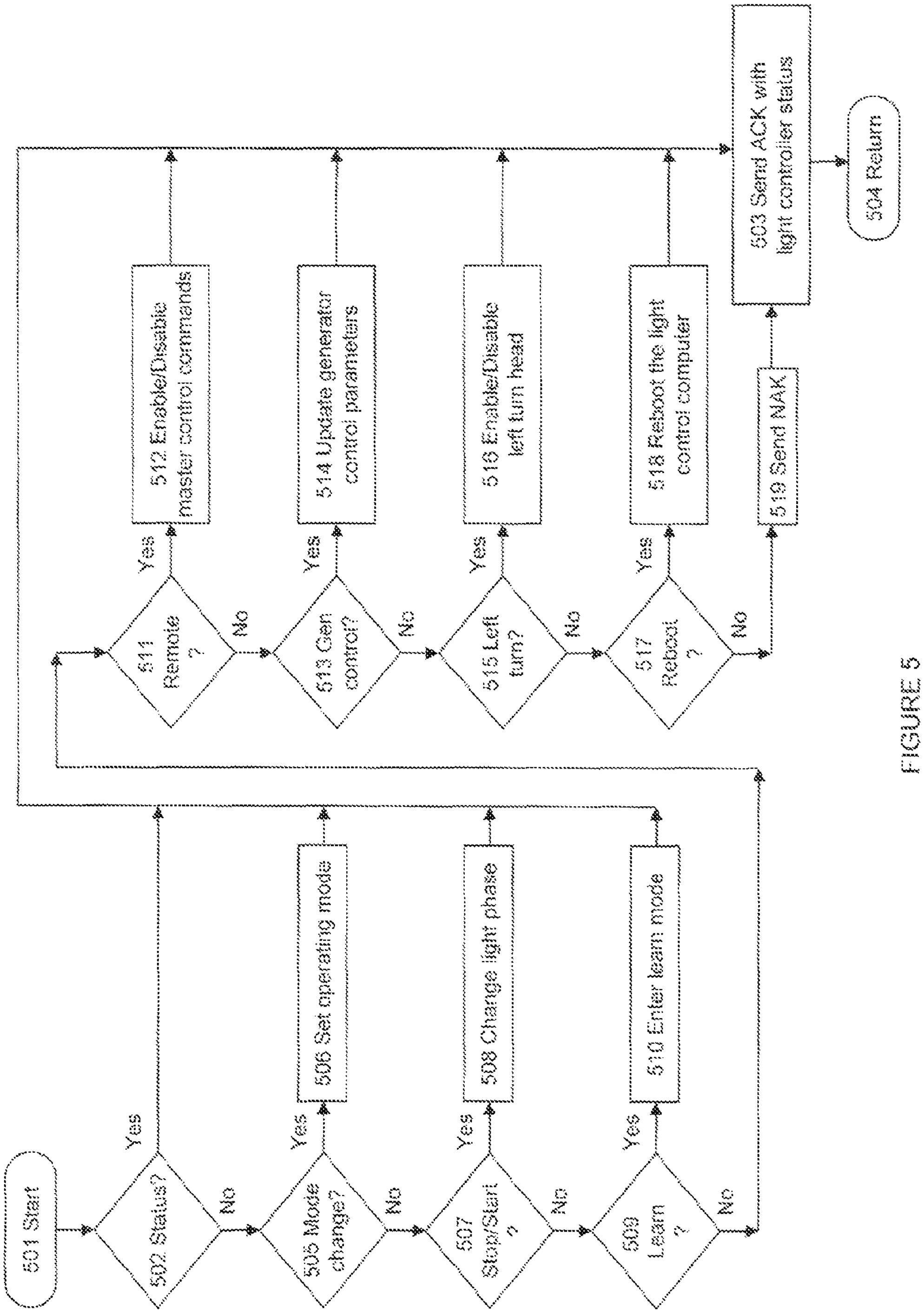
FIG. 5 is a flow diagram of the user command processing of the light controller server software.

In order to facilitate the MCU's auto discovery function, which is described below, the LTC will also transmit a beacon message during initialization containing its identifier and other status information, notifying all MCUs in the radio neighborhood of its presence and availability for service. Once initialization is complete, the server enters the server loop by first establishing a mutual exclusion lock on the data shared with the server threads 403, essentially locking out the network command interface and precluding data corruption from multiple processes writing to the same storage area. Once the lock is obtained, the radio modem is accessed for any valid received messages addressed to this LTC 404, which may be commands from the MCU, from the handheld remote control, or other authorized personnel. LTC commands, the processing of which are described in FIG. 5, are acted upon and then acknowledged with the format of the acknowledgement being specific to the type of the originator (MCU, handheld remote, or other user).

Once the radio modem processing is complete, the operator's console display is updated, and any keystrokes are serviced 405. The operator's console display and keypad layout is described in FIG. 7. The console display consists of basic LTC status information. The keypad can be used to issue a limited set of LTC commands (e.g., start, stop, start left, stop left, mode change, auto/local select, learn) and, if so configured, a limited set of MCU commands (red, flash, and sequence).

Once the operator's console has been serviced, any learn mode processing is performed 406. While in learn mode, the LTC scans the received radio messages for separate start and stop commands that are tagged with the handheld remote ID, indicating that they originated from the same handheld remote. If such a pair is received before the learn mode timer expires, the identifier of the originating handheld remote is 'learned' by the LTC, and the LTC updates its configuration file accordingly, making the change permanent across power cycles. Once learn mode completes, successfully or not, the LTC enters standard mode, cycles to red, and awaits further command.

Once learn processing is complete, the LTC interrogates the on-board hardware for fault such as a failed signal lamp 407. If any such faults are detected, the LTC begins reporting a hardware fault in the status portion of all subsequent acknowledgement messages notifying the sender of the condition. The LTC will continue to report the error condition until the fault has cleared and remained cleared for a configurable time period, nominally 15 minutes, giving users such as the MCU and the APS-based applications (such as the network watcher) ample opportunity to take any necessary actions. Next, the supply voltage, temperature inside the LTC, GPS location and compass headers are sampled 408. This data is included in the status portion of subsequent acknowledgement messages.

At this point, if so equipped, the generator and charging system (which is explained in more detail in FIG. 6) is serviced 409. This process involves attempting to start the generator when the line voltage is below the configured value, detecting when the generator is running and presumably charging the batteries, attempting to stop the generator after a fixed and configurable run time has elapsed or when so commanded, detecting with the generator has stopped running, and detecting when the generator is low on fuel. Once any generator servicing is complete, any pending red light or flasher mode phase transitions are handled 410. A pending red light occurs when the LTC has transitioned either the standard or left turn signal head into the yellow phase and has scheduled a phase change to red at a future time. If that time has passed, the LTC will transition the appropriate signal head to the red phase. Similarly, when in flasher mode, the LTC will schedule a phase transition, on-to-off or off-to-on, to occur twice a second. The LTC uses the timing information derived from the GPS signal to synchronize flasher mode phase transitions to the atomic clock at the United States Naval Observatory in Washington, D.C. In so doing, the LTC synchronizes flasher mode phase transitions of all coordinating signals. The LTC may be configured to illuminate the selected signal lamp during either the top half or the bottom half of the second, allowing signals in one phase to flash alternately with the signals in a second phase. When the timer expires, the LTC will perform the necessary phase change by turning the selected signal lamp on or off as need be and then schedule the next change to occur one half second hence.

Once the pending red light or flasher mode phase transitions handling is complete, the LTC will, on a specified interval and if network connectivity is available, attempt to report its performance directly to the APS, bypassing the MCU 411. Once the latter step is complete, the LTC will maintain its log files on a specified interval 412. Any log files larger than a specified size will be rotated (i.e., the current contents will be moved to a backup file, and any subsequent log messages will be directed to a new file). The backup file will be offloaded to the APS, if possible, and then deleted from the system. Once these processes complete, the LTC releases the mutual exclusion lock 413 and goes to sleep for a brief period of time 414, allowing external users to access to the server.

Where communications exist, authorized users can issue network commands directly to the LTC server. If such a command arrives while the LTC is sleeping 415, the server portion of the software spawns a thread to service each request 416. The first step in processing a user request is to establish a mutual exclusion lock on the shared server data 417. Once the lock is obtained, the user LTC user command is executed and acknowledged 418. In step 418, the set of commands recognized by the server on the network interface is identical to the set recognized in step 404, and the processing of the user commands is as described in FIG. 5. Once the LTC user command processing is completed, the mutual exclusion lock is released 419, and the server thread terminates 420.

FIG. 5 is a flow diagram that shows the processing of the LTC commands. Processing of a command starts 501 when the routine is called from the mainline of the LTC executive or as the result of a network user command. If the command is a request for status 502, then an acknowledgement containing the comprehensive LTC status is formulated and sent back to the originator 503 and control is returned to the calling routine 504. If the command is a mode change command 505, and if remote commanding is not locked out and if the command contains the correct MCU ID, the operating mode of the LTC is changed accordingly 506. For standard mode, the LTC terminates other operating modes, cycles the standard signal head to the red phase and, if so equipped, cycles the left turn signal head to the red phase as well. In either case, if the signal head in question is not already in the red phase, the signal will be transitioned to the yellow phase, and a pending red timeout will be set. For flasher mode, the LTC terminates other operating modes and, in the case of flash yellow, transitions the standard and, if so equipped, the left turn signal head, to the yellow phase. In the case of flash red mode, the LTC will briefly transition the standard signal head and, if so equipped, the left turn signal head, to the yellow mode before initiating red flash mode.

For pilot car mode, the left signal head, if so equipped, is disabled, and the standard signal head is transitioned to red as described for standard mode. As with all remaining commands, once the processing of the command is complete, an acknowledgement containing LTC status is sent to the originator, and control is returned to the caller. If the command is a start or stop command for the standard or left turn signal heads 507, and if remote command is not locked out and if the command has the correct MCU ID, the phase of the signal is changed as commanded 508.

While the LTC is operating in standard mode, a start command will cause the LTC to transition the standard signal head to the green phase, and a start left command will do the same for the left turn signal head. Likewise, a stop command will cause the LTC to cycle the standard signal head to the red phase, through the configurable duration yellow phase, as necessary, and a stop left command will do the same for the left turn signal head. While the LTC is operating in the flasher mode, a start command will cause the LTC to change the standard signal head's flash color to yellow, and a stop command will cause it to change the standard signal head's flash color to red. Similarly, while in flasher mode, a start left command will cause the LTC to change the left turn signal head's flasher color to yellow, and a stop left command will cause it to change the left turn signal head's flasher color to red.

While the LTC is in pilot car mode, a start command will cause the LTC to either change the main signal head phase to green and start a countdown timer or, if the signal was already in the green phase, add a fixed and configurable number of seconds to the already running countdown timer. Should the timer expire, the LTC will transition the standard signal head phase from green to red, through a yellow phase of configurable duration. While the LTC is in pilot car mode, a stop command will also cause the LTC to transition the standard signal head to red phase, just as if the timer had expired. While the LTC is in pilot car mode, start left and stop left commands will be ignored.

If the command is a learn command 509, the LTC enters learn mode 510 and begins to listen for a pair of commands (a start and a stop command originating from the same handheld remote control within a certain timeout period. If the command is a remote command 511 and has the correct MCU ID, then the LTC examines the parameters and determines whether remote commanding is being enabled (i.e., commanding by the MCU is to be allowed) or disabled (MCU commanding to be locked out) and changes the state operations accordingly 512. If the command is a generator control command 513, the LTC parses the parameters (enable/disable, threshold voltage, run time, quiet hours start and end), saves the details to the configuration file, and then executes the specific generator control command 514; enable, which turns on the generator control function; disable, which turns off the generator control function; run, which starts a generator run sequence; or stop, which terminates any ongoing generator run sequence. If the command is a left turn enable/disable command 515, then the LTC parses the parameters to determine whether the left turn signal head is being enabled or disabled, updates the configuration file, and modifies processing accordingly 516. If the command is a reboot command 517, then the LTC issues a time-delayed reboot command to the system 518, allowing the command to be acknowledged before the reboot begins. If the command was not a reboot command, then the set of recognized LTC commands is exhausted, a negative acknowledgement message is formulated and sent to the originator 519, and control is returned to the caller.

Figure 6:
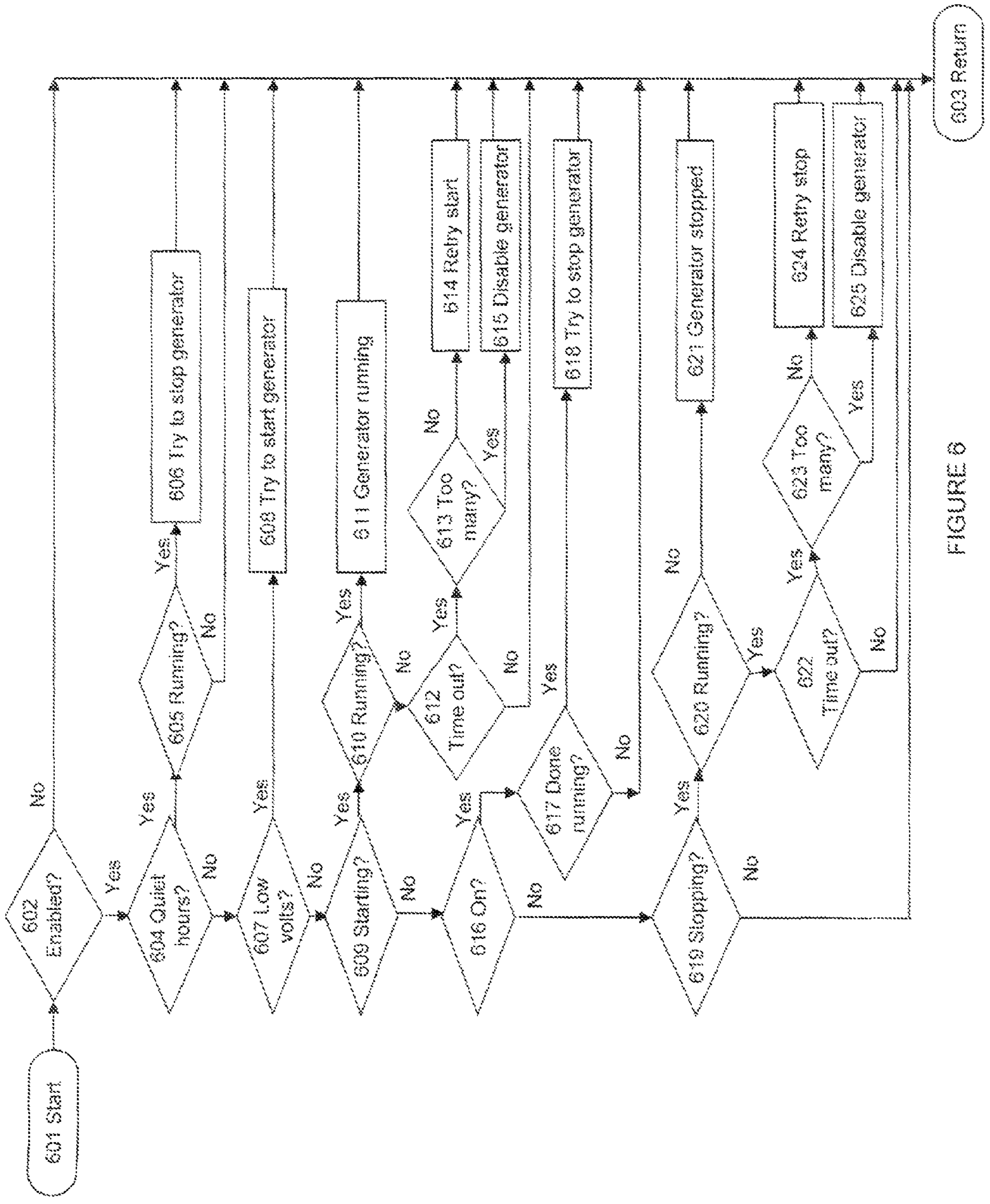
FIG. 6 is a flow diagram of the automated generator control processing of the light controller server software.

FIG. 6 is a flow diagram depicting the automated generator control process. Processing begins when invoked by the main line of the light controller server 601 and continues with testing whether the automated generator control function is enabled 602. If it is not, processing is complete, and control is returned to the caller 603. If control is enabled, then the configurable quiet hours (a period of time in which the generator should not be run) is compared against the system clock to determine whether quiet hours are in effect 604. If quiet hours are in effect, a check is made to determine whether the generator is running 605. If the generator is running, the LTC will try to stop the generator 606 by applying power briefly to the generator stop circuit, after which control is returned to the caller. If quiet hours are not in effect and the generator is not being run, a test is made to determine whether the supply voltage is less than the configurable threshold voltage 607. If so, then the LTC will attempt to start the generator 608 by applying power briefly to the generator start circuit. Otherwise, a test is made to determine whether the LTC is in the process of starting the generator 609. If so, a test is performed to determine whether the generator is producing alternating current 610, and, if so, the LTC will declare the generator to be running 611. If the generator is not running, a timer is consulted to determine whether a timeout has occurred 612. If a timeout has occurred, a test is made to determine whether too many consecutive timeouts have occurred 613. If not, the LTC will retry the start process 614 by again applying power briefly to the generator start circuit.

If all start retries have been exhausted, the LTC declares the generator to be disabled 615, effectively precluding further processing until the generator is manually re-enabled. If the LTC was not trying to start the generator, a test is made to determine whether the generator is being run by the LTC 616. If so, a test is made to determine whether the configurable generator run time has elapsed since the generator was declared to be running 617. If so, the LTC will attempt to stop the generator by briefly applying power to the generator stop circuit 618.

If the generator was not being run by the LTC, a test is then made to determine whether the LTC is attempting to stop the generator 619, and, if so, a test is made to determine whether the generator is producing alternating current 620. If the generator is not producing alternating current, the LTC declares the generator to be stopped 621, if the generator is producing alternating current, a test is made to determine whether a timeout has occurred since the last attempt to stop the generator 622, and, if so, a test is made to determine if too many consecutive timeouts have occurred 623. If not, the LTC will again attempt to stop the generator 624 by briefly applying power to the generator stop circuit. If all stop retries have been exhausted, the LTC declares the generator to be disabled 625, effectively precluding further processing until the generator control function is manually re-enabled. After this, control is returned to the caller 603.

Figure 7:
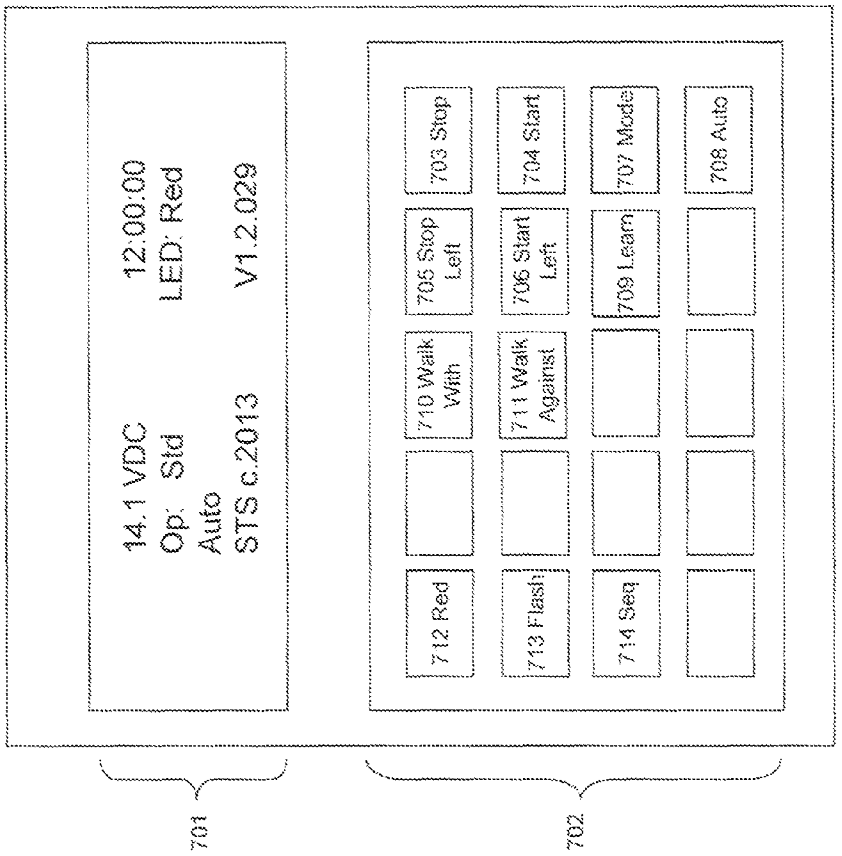
FIG. 7 is a screenshot of the operator's console display and a diagram of its keypad layout.

FIG. 7 is a depiction of the LTC's operator's console, showing both the display portion 701 and the keypad 702. The display includes supply voltage, current time, operating mode, standard signal head phase, and the MCU lock out state (auto vs. local) and software identification.

Reference numbers 703 through 709 are keys on the operator's console keypad by which onsite personnel can send commands to the LTC, the effect of which is identical to similar commands received from other interfaces (e.g., the network or radio modem interfaces). When the user presses the start 704, stop 703, start left 706, or stop left keys 705, the LTC acts upon them in the manner described above. When the mode key 707 is pressed, it causes the LTC to cycle through operating modes in the following sequence: standard, flasher, pilot car, and then back to standard. Pressing the auto key 708 causes the LTC to toggle the master control lock out mode between auto (MCU commanding allowed) and local (MCU commanding locked out). Pressing learn key 709 causes the LTC to enter the learn mode and to prompt the user to push specific buttons on the handheld remote control whose identification is to be learned.

Reference numbers 710 through 714 are keys on the operator's console keypad by which onsite personnel can send commands to the MCU, thereby effecting the operation of all signals at the intersection. Pressing the walk with 710 or walk against 711 key will cause the LTC to send the corresponding event notification to the MCU, notifying it of user demand either for traffic moving parallel with traffic approaching the traffic signal (walk with) or for traffic moving across traffic approaching the traffic signal (walk against). Pressing the red key 712 will cause the LTC to send a 'mode change red' command to the MCU, which, if successful, will cause all traffic signals at the intersection to cycle to the red phase. Pressing the flash key 713 will cause the LTC to send a 'mode change flash' command to the MCU, which, if successful, will cause all traffic signals at the intersection to change to flash mode, the color of which is determined by the saved master control configuration. Pressing the sequence ('seq') key 714 will cause the LTC to send a 'mode change auto' command to the MCU, which, if successful, will cause the MCU to begin automatically sequencing the phases of the traffic signals at the intersection according to its saved configuration.

Figure 8:
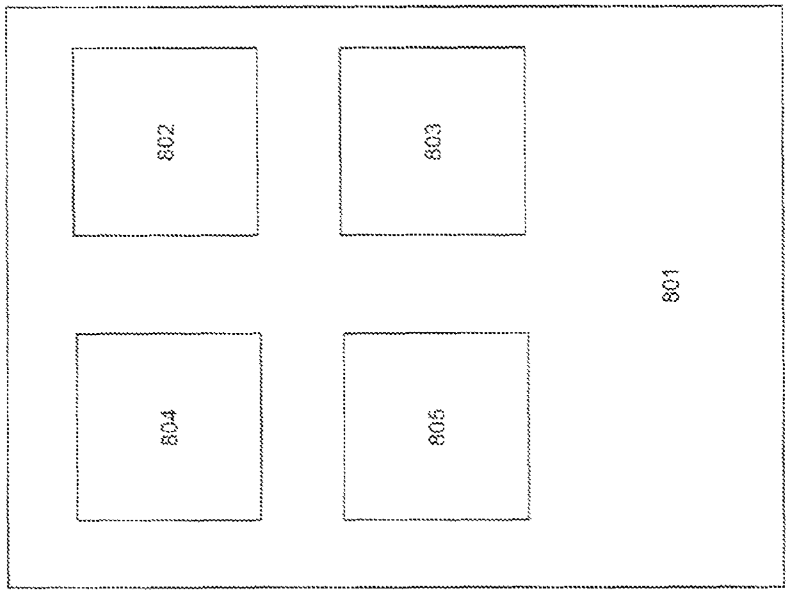
FIG. 8 is a diagram of the button layout of the handheld remote control.

FIG. 8 shows the handheld remote control 801 and its push button layout. Reference numbers 802 through 805 represent buttons that, when pressed by onsite personnel, cause the handheld remote to transmit a command code containing the handheld remote control's unique ID, corresponding button code, and checksum, which, if received by a radio modem on an LTC that is configured to accept commands containing the control's unique ID, will cause the LTC to execute the corresponding command (e.g., stop 802, start 803, stop left 804, or start left 805) as if that command had been received from the network interface or operator's console.

Figure 9:
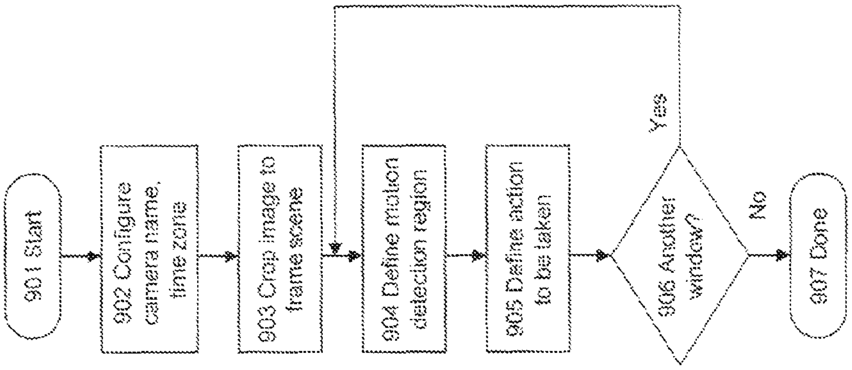
FIG. 9 is a flow diagram of the camera configuration procedure.

FIG. 9 is a flow chart showing the LTC camera configuration procedure. The camera configuration procedure is started 901 by control center personnel whenever the camera arrives at a new location. The camera is configured 902 to have a name that is related to the name of the LTC in which it is installed and to know where to find the current time and in which time zone it is installed. The camera's image is cropped 903 to frame the approaching traffic and to discard portions of the image not related to traffic control so as to reduce the amount of data to be transferred to the NOC. The camera is also configured to shrink the image in each dimension by an inverse power of two (usually one-half) in order to further reduce the number of pixels required to represent the image and further reduce uplink bandwidth.

Once the scene is framed, an event detection window is defined 904 in terms of location within the frame and in terms of other camera-dependent parameters relating to various threshold values that must be crossed for the camera to declare a vehicle arrival event to have taken place. Once a motion window is defined, the action to be taken upon such an event is defined 905. The action will typically be to contact the MCU and report the event along with an identifier by which the MCU can identify the signal at which the motion is detected. If there are more motion detection windows to be defined 906, the previous steps 904, 905 are repeated. Once all windows are defined, the process is complete 907.

For a number of reasons involving viewing geometry and traffic flows, the motion detection process may falsely trigger on traffic moving away from the traffic signal or may trigger multiple times for a single vehicle. To account for this, in most cases the MCU only considers motion detection events for signals that are already in the green phase and uses the occurrence of such event to extend the duration of the current green phase up to the maximum allowable time. This has the effect of ignoring the false triggers for traffic moving away from the signal (because the signal is presumably in red) and has the effect of using only the final event when a vehicle generates multiple events. Although the system records the number of vehicle detection events, it make no decisions based upon the absolute number of such events or the rates of their occurrences.

Figure 10:
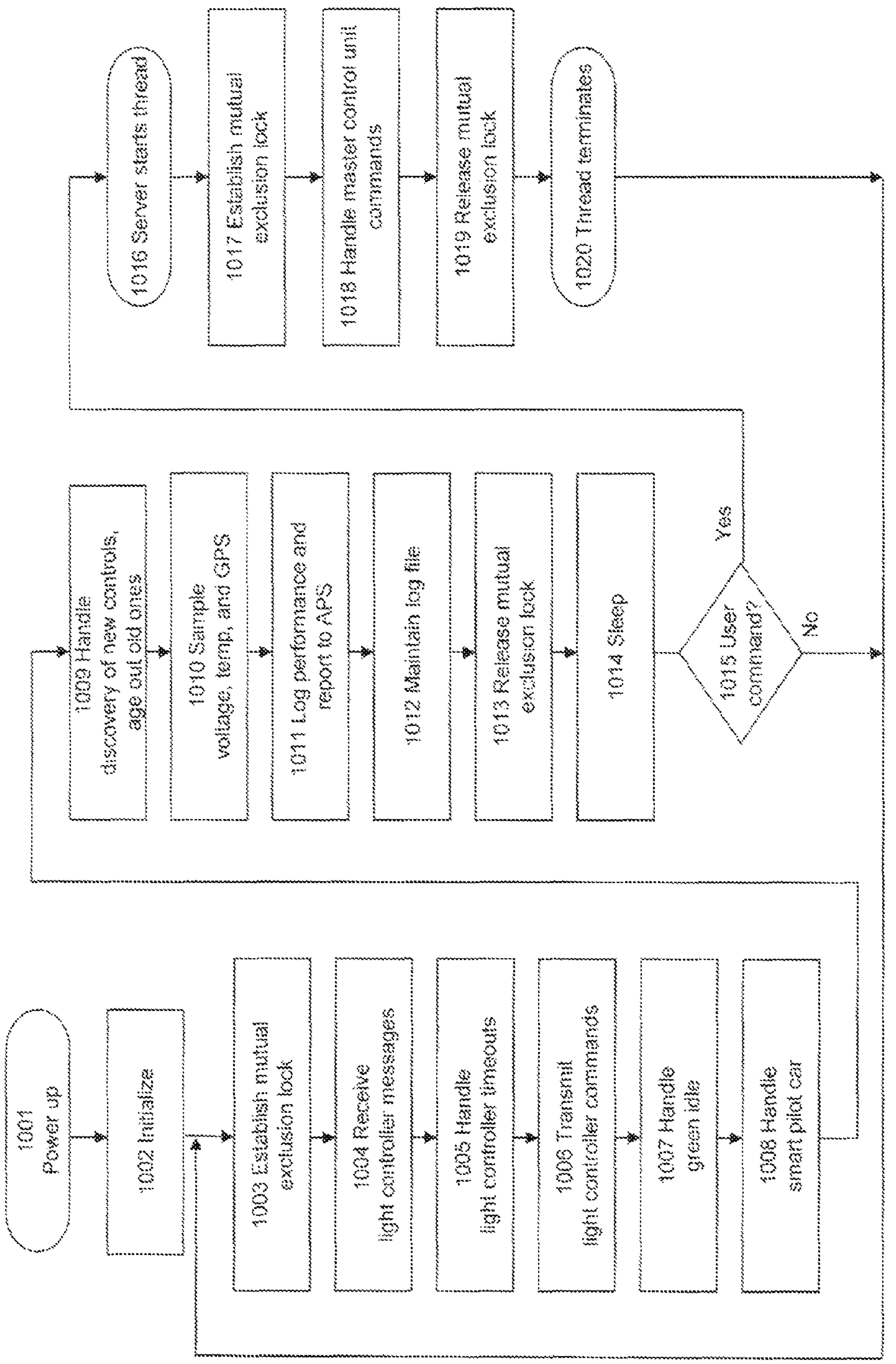
FIG. 10 is a flow diagram of the components of the master control unit server software.

FIG. 10 is a flow chart of the application functions within the MCU server software, which is a software program running on one of the LTCs in an intersection and which exercises control over all coordinating onsite LTCs. The MCU server software is a control application with web server functions, allowing it to act as a server by accepting commands from, and returning responses to authorized users and user applications via a network connection and also to act as an application controlling a real-time process. It is organized as a loop that repeats for as long as the computer remains in operation, as depicted on the left in this figure, and a series of separate threads that are spawned by the server portion of the software in response to network user commands, as depicted on the upper right in this figure.

At power up 1001, the various electrical components of the MCU power themselves up, and the MCU's operating system bootstraps itself into operation and eventually starts up the MCU server software. After startup, the server initializes itself 1002 by reading its configuration file, which may contain: a list of LTCs; a set of two or more phase definitions, each consisting of a flow name, a maximum green duration (green max), a minimum green duration (green min), the green time increment (green idle), yellow phase duration (yellow), time to clear the intersection (clear time) and a set of LTCs assigned to that phase and the cameras associated with each; and an operating mode (e.g., standby, red, flash, sequencing). If no configuration file is found, the MCU will enter standby mode, passively listening to radio traffic to identify onsite LTCs and also waiting for the discovery process to produce the definitive list. As part of the initialization process, a list of zero or more LTC commands are composed that taken together implement the mode of operation described by the configuration file. In this way, the operating state of the MCU, and the intersection it controls, is persistent across reboots and power cycles. As part of the initialization process, the MCU also launches the automated discovery mechanism (described below in FIG. 12).

Once initialization is complete, the server enters the server loop by first establishing a mutual exclusion lock on the data shared with the server threads 1003, essentially locking out the network command interface and precluding data corruption from multiple processes writing to the same storage area. Once the lock is obtained, any pending LTC messages are received 1004. Each pending message is processed in the order received and is either an acknowledgement of a previous MCU command, a command from an LTC to the MCU or a message that is unrelated to this MCU's activities (e.g., errant transmissions). Acknowledgements of previous commands are checked against any pending unacknowledged command, and, if a match is found, the pending command is labeled a success, and a countdown to the next command transmission begins. Any commands from the LTCs to the MCU are acted upon, if valid. Any unrelated message traffic is used to maintain a list of onsite signals, wherein if the message identifier corresponds to a known LTC (i.e., an LTC authorized to be operated at this intersection and by this client user) and that LTC is not already on the list of onsite LTCs, it will be added to the list and included in any subsequent MCU status messages. This is a critical piece of the automatic discovery mechanism and works with the LTC's beacon function to allow the master controller to reliably detect the presence of LTCs not actively being controlled.

Once this processing is complete, LTC timeouts are handled 1005, wherein any LTC commands that have remained unacknowledged in excess of a configurable time period are declared to have failed, and after which the failure count is incremented and checked against a maximum failure count. If the failure count has been reached, the MCU changes to the alternate radio band, resets the retry counters, and restarts the transmission process. If the failure count has reached the maximum and all radio bands have been exhausted, the MCU will declare a fault, deeming itself not to be in control of the intersection, make the configured notifications, and restart the command sequence from the beginning in order to re-establish, and subsequently maintain, control of the intersection. Once the timeout processing is complete, any scheduled LTC commands are transmitted 1006. The current time is compared against the next scheduled command transmission time, and, if found to be less, the next scheduled command is sent, addressed to the intended LTC, and the acknowledgement countdown timer begins.

Once that processing is complete, any green idle events are detected and handled 1007. A green idle event occurs when, during sequencing operations, the MCU detects that the current phase has been active in excess of the configurable minimum green time, but less than the maximum time, and there have been no vehicle arrival events attributed to any signal on that phase for more than the configurable green idle time. When a green idle event occurs, the master controller simply advances to the next command in the command sequence and, by doing so, prematurely terminates the current traffic phase and advances to the next, passing control of the intersection from an idle phase to one that perhaps has traffic waiting to be serviced.

Once that processing is complete, and if the MCU is operating in smart pilot car mode, any smart pilot car mode processing 1008 is performed, wherein a check is made for the reception of any commands from a handheld remote control containing an identifier for which the MCU has been configured to respond. The only relevant commands originating from the handheld remote are: a start command, which causes the MCU to either command the associated signal to green and schedule the end of that phase for a configurable number of seconds hence or, if the signal is already in the green phase, add a configurable number of seconds (the pilot car green idle time) to the scheduled end of the current green phase; and a stop command, which causes the MCU to command the LTC to immediately cycle to the red phase.

Once that processing is complete, the auto discovery function is handled 1009, wherein information about any LTCs detected by the independent auto discovery process is received and integrated with the MCU's existing list of active controllers and monitors, and any newly discovered units are added to the list for subsequent reporting and usage. After this step, the list of active onsite LTCs is examined for any entries whose time of last contact is greater than a configurable value. Any such entry that is not part of the active configuration (i.e., is not an LTC being actively commanded) is deemed to be unreachable and is removed from the list (and removed as a selection option from any MCU user applications).

Once that processing is complete, and on a periodic basis, the MCU samples its supply voltage, operating temperature and GPS location 1010 for subsequent reporting to the APS and use by the network watcher. Once that processing is complete, and on a periodic basis, the MCU server software reports certain performance statistics to the APS 1011 in order to paint a fuller picture of system operation. Once that processing is complete, any open log files are checked against a configurable maximum length and, if too large, are rotated 1012 in a fashion similar to that described in FIG. 4 (reference number 412).

Once these processes complete, the MCU server software releases the mutual exclusion lock 1013 and goes to sleep for a brief period of time 1014, allowing external users to access to the server. Where a network connection exists, authorized users can issue network commands directly to the MCU server software. When a user command arrives, it is detected by the server 1015, which spawns a thread to service that request 1016. The first step in processing a user request is to establish a mutual exclusion lock on the shared server data 1017. Once the lock is obtained, the MCU server software command is executed 1018 and acknowledged, and any requested data is returned to the originator. The set of commands recognized by the server is described in FIG. 11. When processing is complete, the mutual exclusion lock is released 1019, and the server thread terminates 1020.

Figure 11:
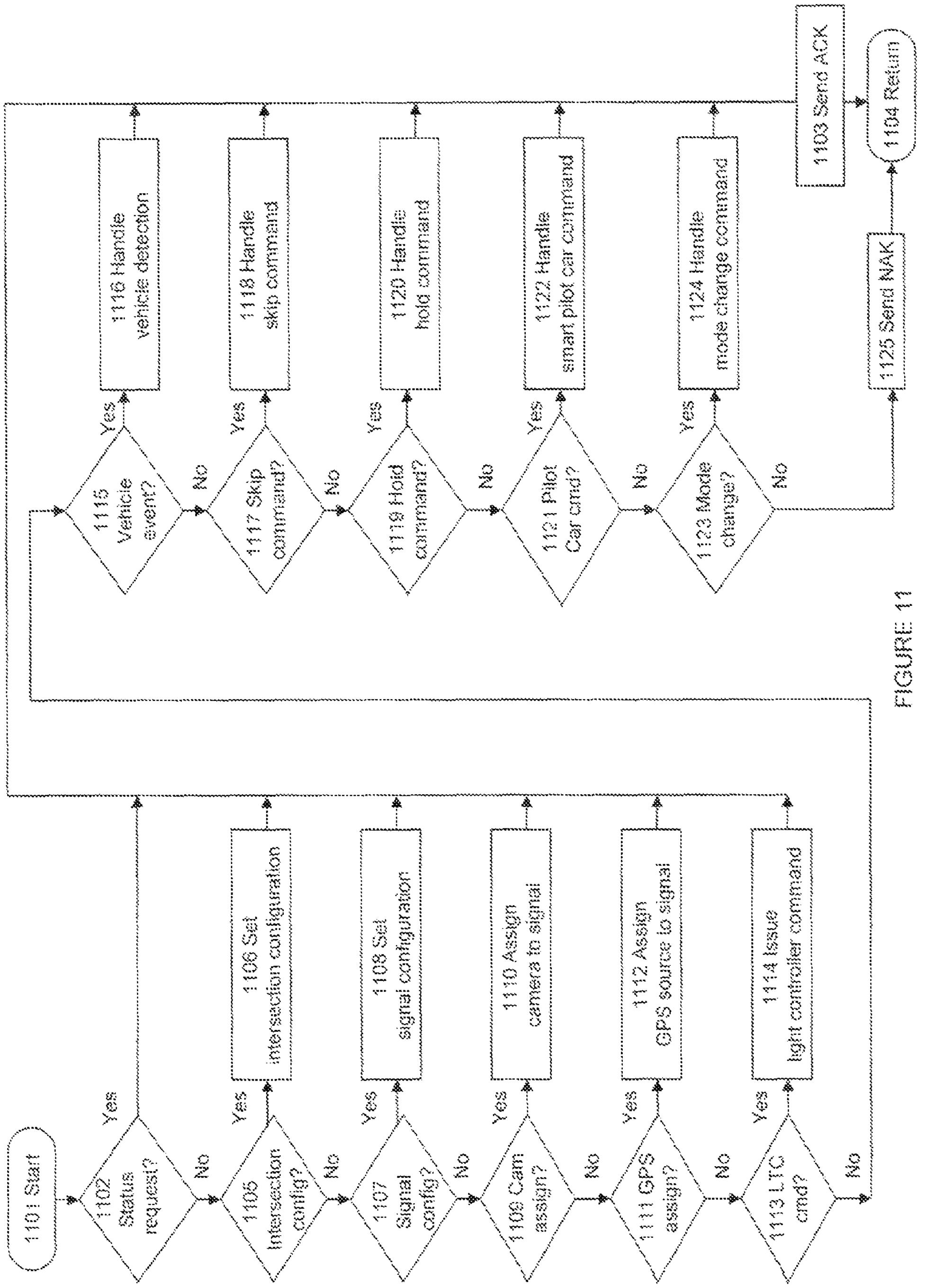
FIG. 11 is a flow diagram of the user command processing of the master control unit server software.

FIG. 11 is a flow diagram that shows the processing of the MCU commands by the MCU server software. Processing of a command starts 1101 when the routine is invoked by the server software as the result of a user command. If the command is a request for status 1102, then an acknowledgement containing the MCU status, which includes the most recent status messages from all onsite LTCs as well as detailed information about current and recent MCU operations, is formulated and sent back to the originator 1103, and control is returned to the calling routine 1104, as is the case for all successful commands. If the command is an intersection configuration 1105, then the MCU server software parses and validates the message parameters, which include intersection name, phase definitions, and smart pilot car timing, and, if the parameters are found to be valid, saves them to the configuration file and modifies its operations to reflect the command parameters 1106. If the command is a signal configuration 1107, then the MCU server software parses and validates the message parameters, which include the assigned latitude and longitude of the signal, flash color (red or yellow), name of the traffic flow being controlled by the signal (e.g., "US 93 Northbound"), and, if the parameters are found to be valid, saves them to the configuration file and modifies its operations to reflect the command parameters 1108.

If the command is a camera assignment command 1109, then the MCU server software parses and validates the message parameters, which includes the name of the camera, the signal to which it is being assigned, and a numeric position that indicates the position of the camera within the set of cameras that may be assigned to the signal, and, if the parameters are found to be valid, saves them to the configuration file and modifies its operations to reflect the command parameters 1110. If the command is a GPS assignment command 1111, then the MCU server software parses and validates the message parameters, which includes the name GPS source and the signal to which it is being assigned, and, if found to be valid, saves them to the configuration file and modifies its operations to reflect the command parameters 1112. If the command is an LTC command to be relayed to a specific LTC 1113, then the MCU server software parses and validates the message parameters, which include the specific LTC command, the address of the target LTC, and any parameters used by the particular LTC command, and, if the parameters are found to be valid, immediately sends the command to the target LTC in a format consistent with the transmission medium 1114. In this way, the MCU acts as a proxy for LTC commands, allowing authorized users to send commands to any LTC via any co-located MCU.

If the command is a vehicle detection message 1115, then the MCU server software parses and validates the message parameters, which include either the name of the camera that generated the command or the identifier of an LTC for which the message is intended to pertain 1116. If the message parameters are found to be valid, the MCU server software determines the intended LTC and updates its list of recent vehicle arrivals, which is used, if relevant and as described below, to extend or limit green phase durations through the green idle and auto skip mechanisms. If the command is a skip command 1117, which has no parameters, the MCU server software processes the command 1118 and determines whether it is operating in the sequencing mode, and if so, whether current green phase has been active for at least its minimum green duration and, if so, immediately advances to the next command in its command sequence and in doing so advances the intersection signal phase or, if the minimum green duration has not been reached, schedules to advance the intersection signal phase once the minimum green time is reached.

If the command is a hold command 1119, which has no parameters, the MCU server software processes the command 1120 and determines whether it is operating in the sequencing mode, and if so, simulates a vehicle detection at each signal in the current green phase, which, depending on the timing of the command in relation to the command sequence, may extend the duration of the current green phase by up to the configurable green idle time, limited by the configurable maximum green duration time.

If the command is one of the smart pilot car commands 1121, then the MCU server software parses and validates the message parameters, which include the command itself (pilot car start or pilot car stop) and takes appropriate action 1122. If the MCU is operating in smart pilot car mode and the lone LTC is in the red phase, a smart pilot car start command will cause the MCU server software to immediately change the lone LTC phase to green and start a countdown timer at the configurable pilot car green idle time. If the MCU is operating in smart pilot car mode and the lone LTC is in the green phase, a smart pilot car stop command will cause the MCU server software to command the lone LTC to cycle to the red phase.

Otherwise, no action is taken by the MCU server software. If the command is one of the mode change commands 1123, then the MCU server software parses and validates the message parameters, which include the command itself (red, flasher, 1-way, sequence or smart pilot car), and takes appropriate action 1124.

Mode change commands will cause the MCU server software to compose a set of LTC commands that will implement the new mode of operation within the context of the configuration file and then to replace the list of commands in current operation with the newly generated list and immediately start executing the commands on the list. For the static modes, where intersection phase does not change once an initial phase has been reached (red, flasher, or 1-way), the command list consists of commands to bring the individual LTCs to the desired operating mode and then a repeating set of status commands that are used to ensure that the LTCs remain in the desired operating mode. For the dynamic modes (sequencing and smart pilot car), the command list consists of commands to bring the LTC or controllers to the desired initial state, followed by a repeating set of commands to sequence the phasing of the LTCs as described by the phase definitions. If the command is not a mode change command (or any other command tested thus far), the set of known commands having been exhausted, a negative acknowledgement is returned to the originator 1125, and control is returned to the caller.

Figure 12:
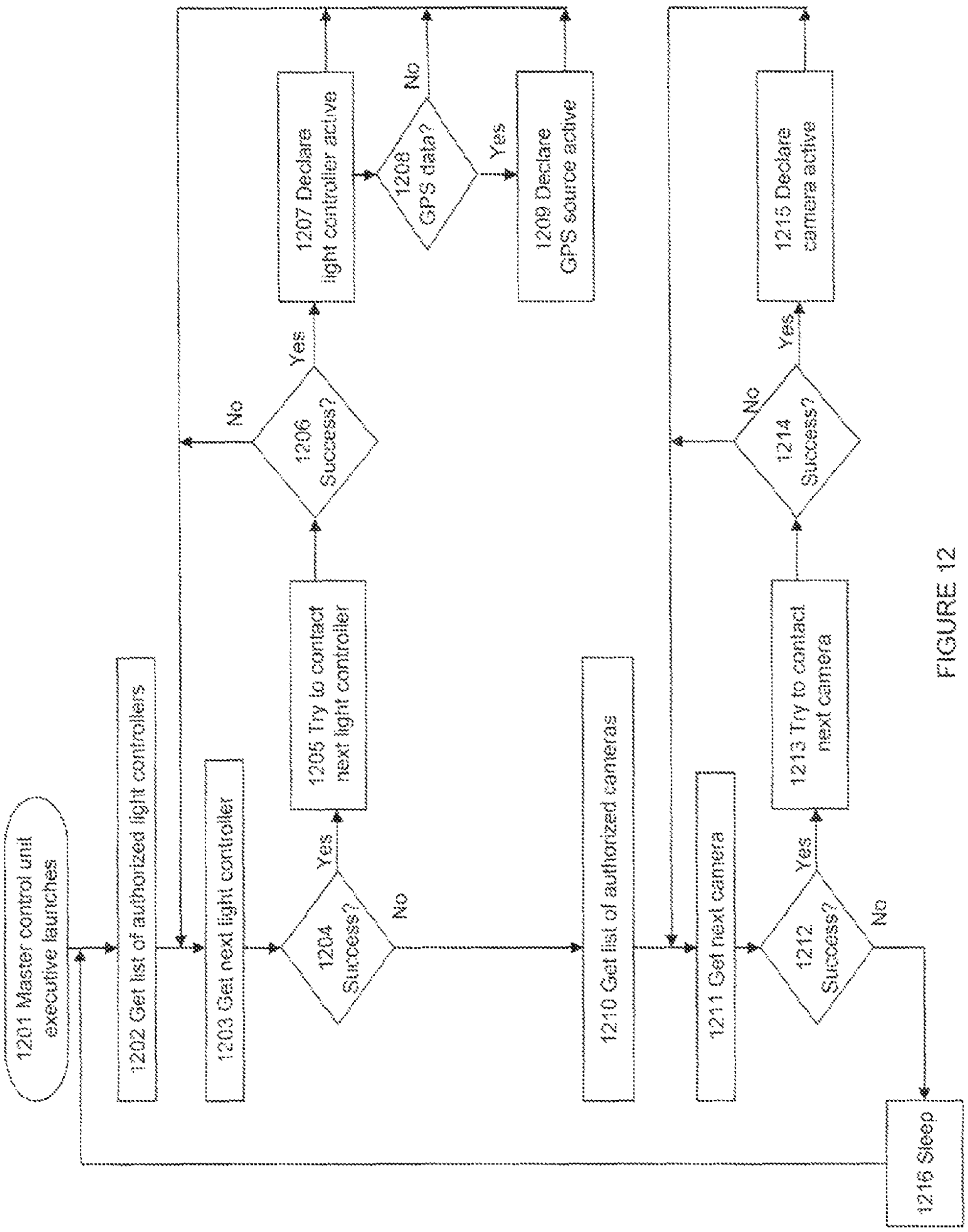
FIG. 12 is a flow diagram of the auto discovery processing portion of the master control unit.

FIG. 12 is a flow diagram of the automatic discovery mechanism employed by the MCU to maintain a list of onsite GPS sources, cameras, and LTCs. All LTCs are GPS sources, each LTC may have one or more cameras, and each is discovered separately. The system maintains a list of all cameras and LTCs that are authorized to work at a given location (e.g., all LTCs operated by a specific organization). The auto discovery process begins operation 1201 when launched during initialization of the MCU server software. The auto discovery process fetches the list of authorized LTCs 1202 and, starting at the beginning of the list, attempts to get the next LTC on the list 1203 and, if successful 1204, requests a status message from the LTC 1205. If this request is successful 1206, then the LTC is declared to be active onsite and is included in subsequent MCU status messages 1207. The status message is also scanned for GPS position data and, if found 1208, the LTC is tagged as a source of such data 1209. This process repeats until the list of authorized LTCs has been exhausted.

Once that processing is complete, the auto discovery process fetches the list of known cameras 1210 and, starting at the beginning of the list, attempts to get the next camera on the list 1211. If successful 1212, the auto discovery process attempts to fetch the main page from the camera's web server 1213. If this attempt is successful 1214, then the camera is declared to be active and is included in subsequent MCU status messages 1215. This process repeats until the list of authorized cameras has been exhausted. Once that processing is complete, the auto discovery process puts itself to sleep for a configurable period of time 1216 before starting the next iteration.

Figure 13:
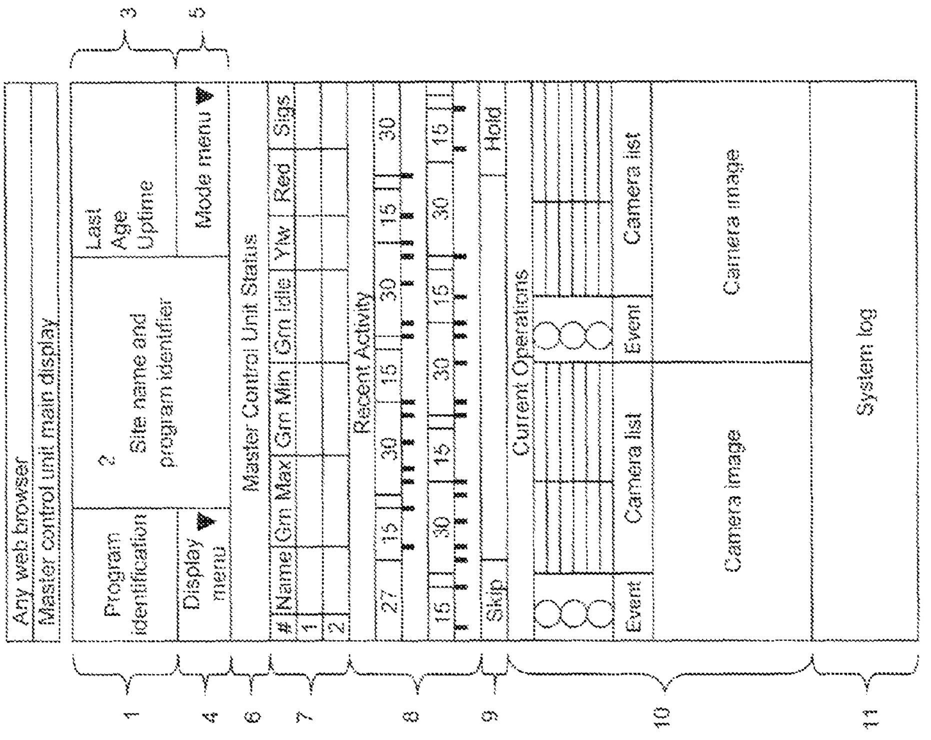
FIG. 13 is a screenshot of the main display of the master control unit.

FIG. 13 is a screenshot of the MCU's main display page, which is designed to display and dynamically update various aspects of the MCU's current configuration and details concerning current and recent operations. The administrative version of this display contains certain controls that the client and public versions do not, and the public version contains even fewer controls. The main display page contains the following sub-displays and fields: a program identifier 1, the name of the intersection and a general display description 2; the time of the most recently received master control status message, its age and the MCU's time in operation 3; a pre-populated drop-down menu for display selection 4; a pre-populated drop-down menu for mode change selections 5, a display of overall system status, including the MCU identifier, status, mode of operation and source voltage 6; the MCU's current operating profile, with phase definitions including phase name, green maximum, green minimum, green idle, yellow, and clear durations, as well as a list of signals belonging to each phase 7; a display of recent signal phases and vehicle arrivals 8 in strip chart format, with one pair of charts for each signal in the current configuration, each chart having phase durations and vehicle inter-arrivals times displayed; skip and hold buttons 9 by which an authorized user can influence the timing of signal sequencing without changing the operating mode and potentially disrupting intersection operations; a current operations display 10 with one panel for each signal in the current configuration, where each panel contains an icon representing the signal phase, a button allowing the authorized user to simulate arrival of a vehicle at the corresponding signal, and a list of signal status parameters, including name, supply voltage, radio link quality, auto/local mode, range from MCU in meters, operating mode of the LTC, vehicle detection counts for the last hour and day, operating temperature within the LTC enclosure, GPS tag and status, distance from assigned location, list of cameras assigned to the signal, and the most recent image from each of the assigned cameras; and a system log area 11 where recent time-stamped system log messages alert the user to specific recent MCU events.

Figure 14:
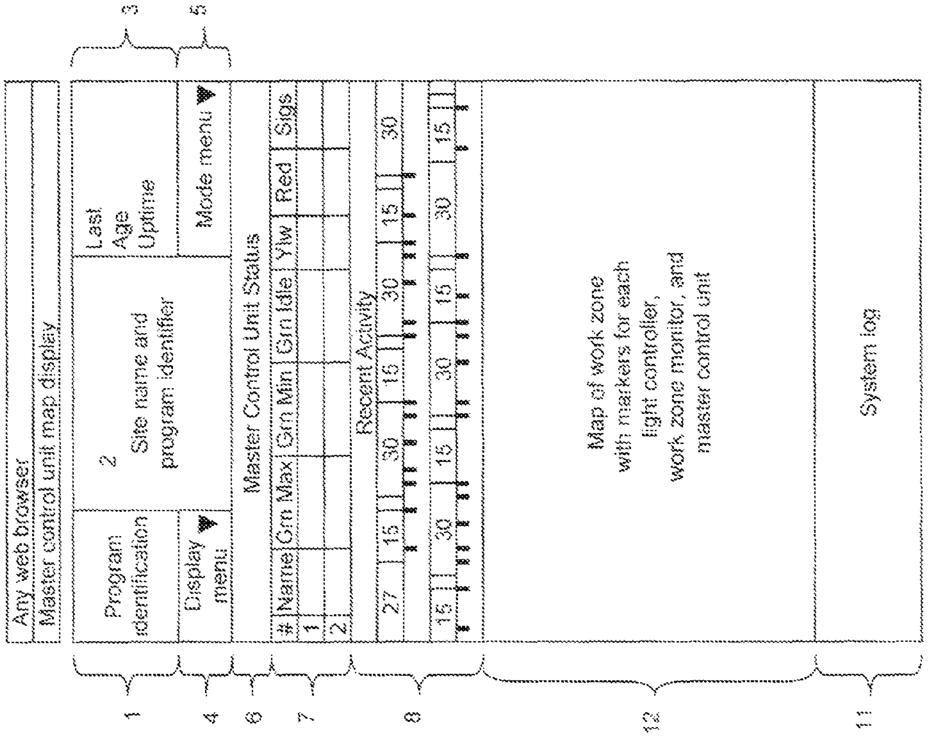
FIG. 14 is a screenshot of the map display of the master control unit.

FIG. 14 is a screenshot of the MCU's map display page, which contains many common display elements from the main display, with the skip and hold buttons and recent activity display elements replaced with a map display 12 depicting the geographical locations of the various onsite cameras. LTCs and MCUs, including those under active control of the MCU and those not under its control. For LTCs, compass information is used to indicate the direction in which the associated signal is pointing. The map display includes markers for each element, which, when clicked upon, will pop up an information box containing information specific to the display element.

Figure 15:
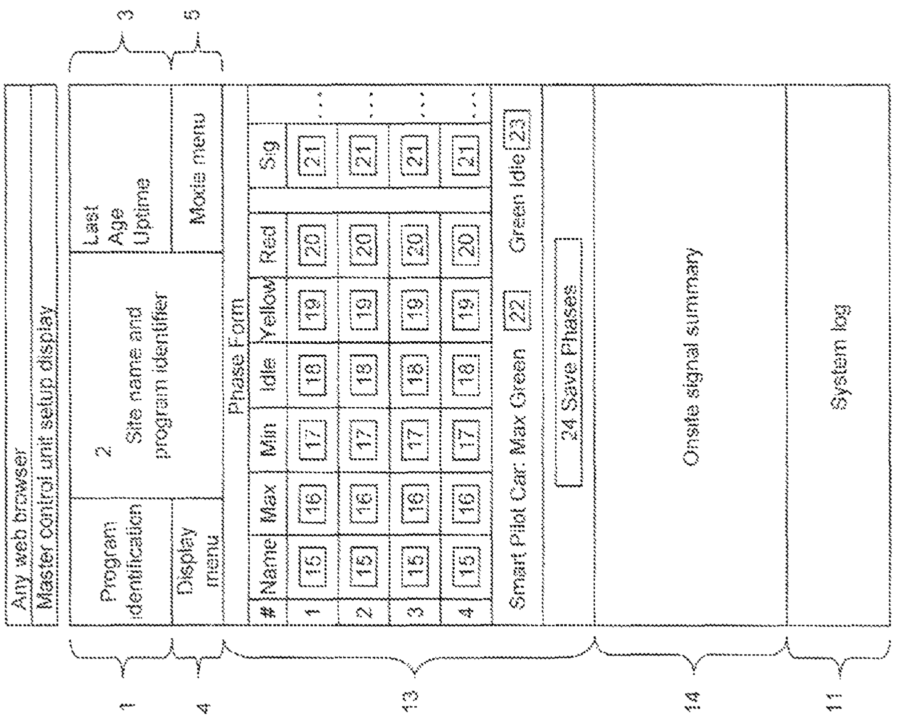
FIG. 15 is a screenshot of the setup display of the master control unit.
Figure 16:
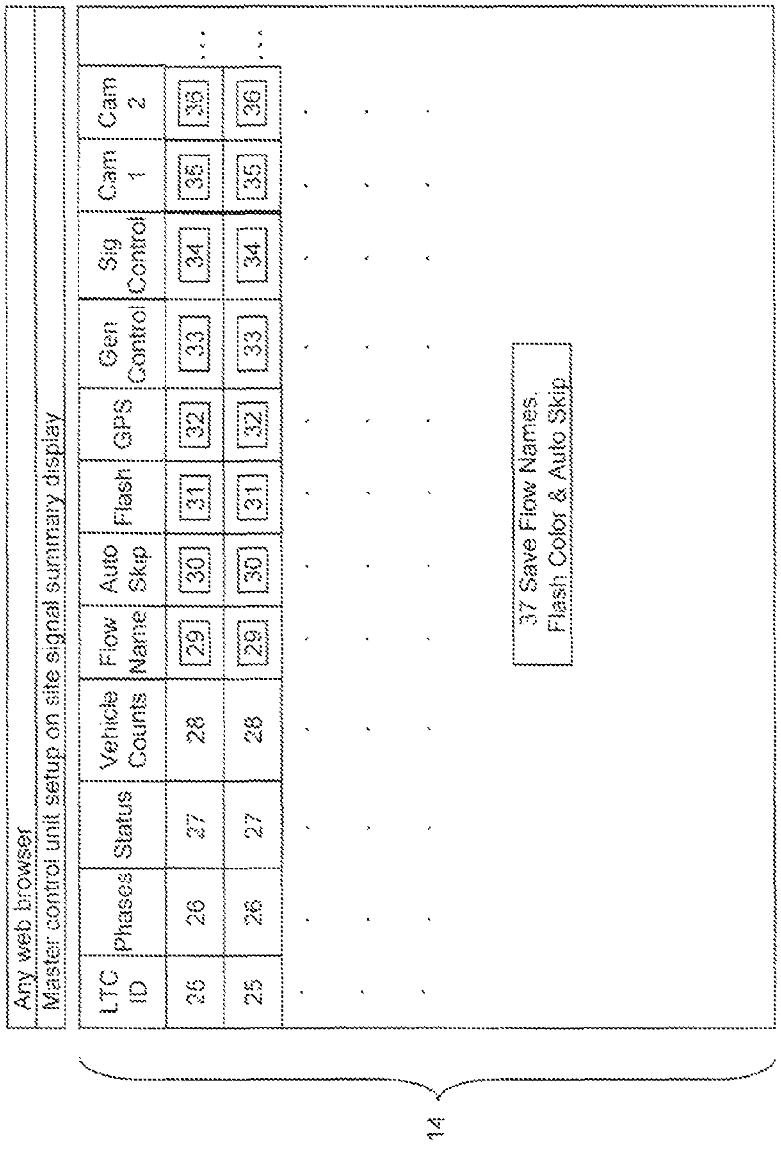
FIG. 16 is a screenshot of the onsite signal summary portion of the setup display of the master control unit.

FIG. 15 is a screenshot of the MCU's setup page, which contains many common display elements from the main display, with the central portion of the display replaced with the phase form 13 and onsite signal summary 14, which is explained in detail in FIG. 16. The phase form is comprised of several fields by which the user can define a set of phases and the set of signals belonging to each phase. The user enters values into the following fields for each phase: name, ideally indicating the nature of the traffic flow tinder this phase 15, green phase maximum duration 16, green phase minimum duration 17, green idle time 18, yellow phase duration 19 and clear phase duration 20, where all signals at the intersection are in red phase simultaneously, allowing the intersection to clear of traffic before advancing to the next phase.

The user also selects one or more signals (and the associated LTC) to be members of the phase 21, where any number of signals may be members, and where a signal may be a member of more than one phase (e.g., a signal controlling northbound traffic may be a member of a north-south traffic phase as well as a north with protected left turn traffic phase). The user specifies each phase, in the desired sequence using one line per phase, with more blank rows being automatically displayed as needed. In addition to the phase definitions, the form also contains two fields specific to the smart pilot car mode of operation: maximum green duration 22 and green idle time 23. Once the user is satisfied with the content of the phase form, the save phases button 24 is used to send the form contents to the MCU, where they replace the current configuration.

FIG. 16 is a detailed screenshot of the onsite signal summary display referenced in FIG. 15. The summary display is used by the MCU to display current information regarding all onsite LTCs that may be available for usage, as well as to accept user input regarding the interrelationships between the components of the system and specific per-signal configuration items. The display is organized as a table of rows and columns, where each row represents a single LTC, and each column represents some aspect of that LTC's operation or user configuration item, the list of which includes: a display of the LTC name 25, any phase memberships 26, various status items including voltage, operating temperature, current phase and time in phase 27, vehicle detection counts for the last hour and day, and time since the last vehicle was detected 28, as well as the following user input fields: flow name 29, auto skip enable/disable 30, flash color selection menu populated with red or yellow selections 31. GPS selection menu populated with known active onsite GPS sources 32, a series of generator control buttons including separate enable, disable, run, and stop buttons 33, a series of signal control buttons including a vehicle detection simulation button, vehicle detection count reset button, start and stop buttons, WiFi enable and disable buttons, and a reboot button 34. In addition, there are two or more camera selection menus 35 and 36, which are pre-populated with all active onsite camera names, and which are used to logically assign cameras to an LTC.

When the user presses any of the generator or signal control buttons on this portion of the page, corresponding commands are transmitted to the MCU for processing. In addition, when the user makes a selection on the GPS or camera menus, corresponding commands are sent to the MCU with no need for further interaction. For the remaining fields (flow name, flash color, and auto skip enable/disable), the user must press the save flow names button 37 to make those changes active.

Figure 17:
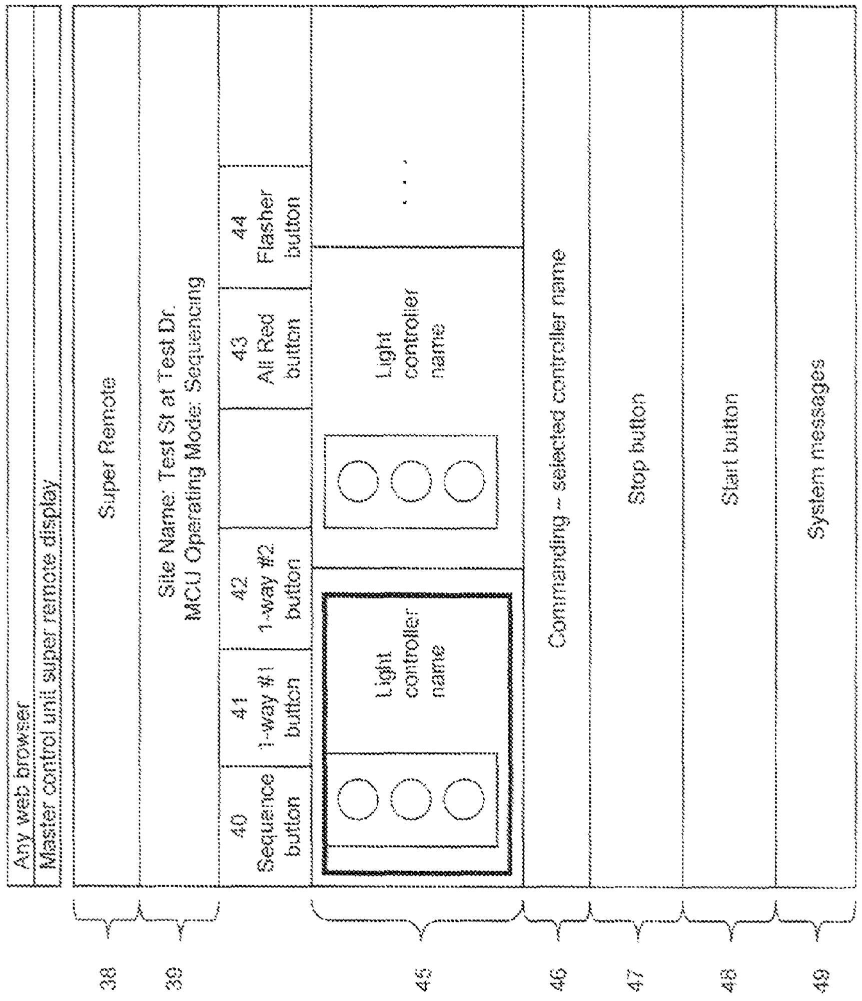
FIG. 17 is a screenshot of the super remote application of the master control unit.

FIG. 17 is screenshot of the super remote application of the MCU server software, which provides simplified control of the intersection as a whole and also of the individual LTCs without the contextual status, mapping, and configuration information of the main display. The super remote display includes the following displays and buttons: a banner identifying the display 38; a sub-header identifying the name of the intersection and the operating mode of the MCU 39; a series of MCU mode changes buttons including a sequence button 40, buttons for one-way flow, the number of buttons varying with the number of phases defined in the phase table (41 and 42 in this example); an all red button 43 and a flasher mode button 44; a signal summary section 45 that displays the LTC identifier for each signal, as well as a traffic signal icon (which also doubles as a signal selection button) indicating the last report phase for that signal, with the selected signal outlined in a heavy border; a header display 46 listing the name of the currently selected signal, which signal would be the target of the start or stop button action; a stop button 47, which allows the user to issue a stop command directly to the currently selected signal; a start button 48, which allows the user to issue a start command directly to the currently selected signal; and a display of recent system messages 49 specifically pertaining to the operation of the super remote application.

Figure 18:
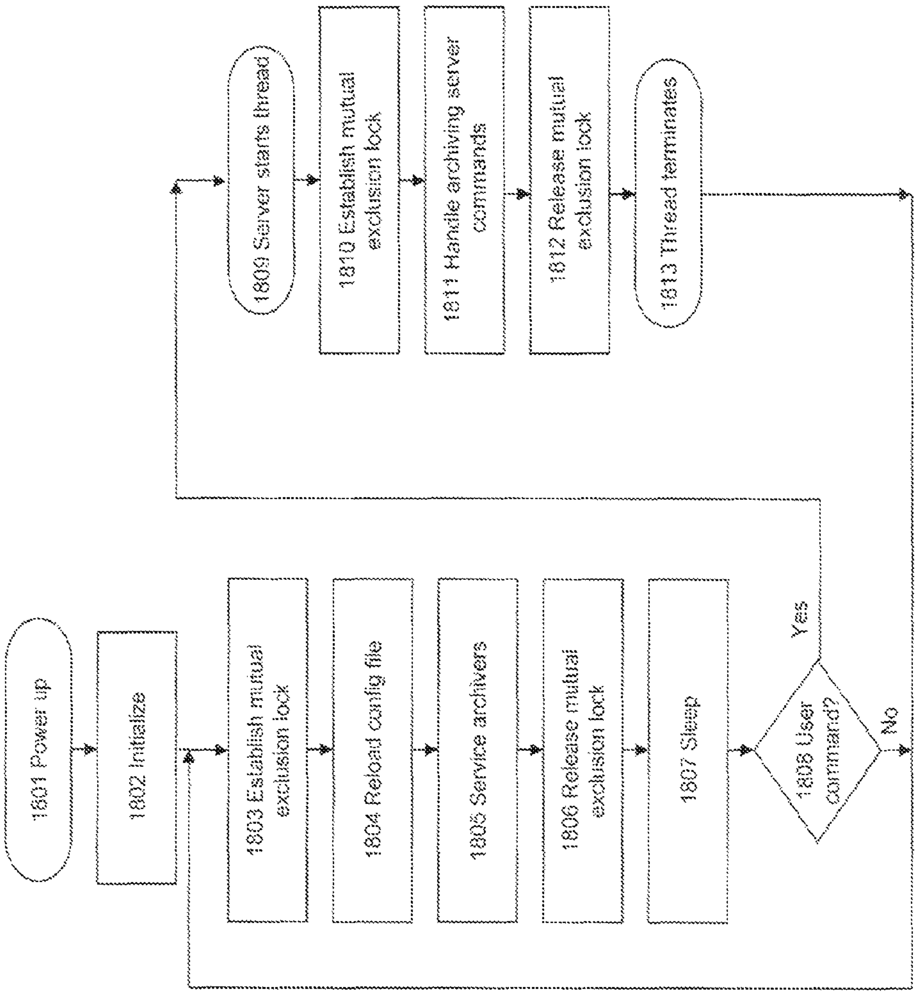
FIG. 18 is a flow diagram of the components of the archiving proxy server software.

FIG. 18 is a flow chart of the fixed APS. The APS is a control application with web server functions that allowing it to both accept commands from, and return responses to, authorized users and user applications via a network connection, as well as to perform its control tasks. It is organized as a background loop that repeats for as long as the computer remains in operation, as depicted on the left in this figure, and separate threads that are spawned by the server portion of the software in response to network user commands, as depicted on the right in this figure.

At power up 1801, the various electrical components of the APS power themselves up, and the APS's operating system bootstraps itself into operation and eventually starts up the APS. As part of the startup process, the server initializes itself 1802 by reading its configuration files, which include information about all MCUs and cameras operating within the system. For MCUs, this information includes: MCU identifier, whether the unit is active, its archiving intervals, whether the associated unit should be watched by the network watcher function (described below), the URL of the unit, an optional customer and division tag, as well as a list of contact emails for cognizant personnel, for use in generating alert and alarm messages by the watcher function. For cameras, this information includes the camera name, whether images from the camera should be periodically downloaded and archived, delays between image downloads, and URLs for the camera's home page and for returning a single snapshot.

As part of the initialization process, an archiver is initiated for each MCU and camera where archiving is enabled. Once initialization is complete, the server enters the server loop by first establishing a mutual exclusion lock on the data shared with server threads 1803, essentially locking out the network command interface and precluding data corruption from multiple processes writing to the same storage area. Once the lock is obtained, the configuration file is re-read 1804, and archivers are added, modified, and deleted as necessary to reflect the most recent configuration. Once that processing is complete, the individual archivers are serviced 1805, where completed archive requests are inserted into the appropriate archive, and where new requests are made according to dynamic assessments of demand. This process is described in detail in FIG. 19.

Once these processes complete, the APS releases the mutual exclusion lock 1806 and goes to sleep for a brief period of time 1807, allowing external users to access to the server. Where a network connection exists, authorized users can issue network commands directly to the APS. When a user command arrives, the server detects this 1808 and spawns a thread to service the request(s) 1809. The first step in processing a user request is to establish a mutual exclusion lock on the shared server data 1810. Once the lock is obtained, the APS command is executed 1811 and acknowledged, and any requested data is returned to the originator. The set of commands recognized by the server is described in FIG. 20. Once command processing completes, the mutual exclusion lock is released 1812, and the server thread terminates 1813.

Figure 19:
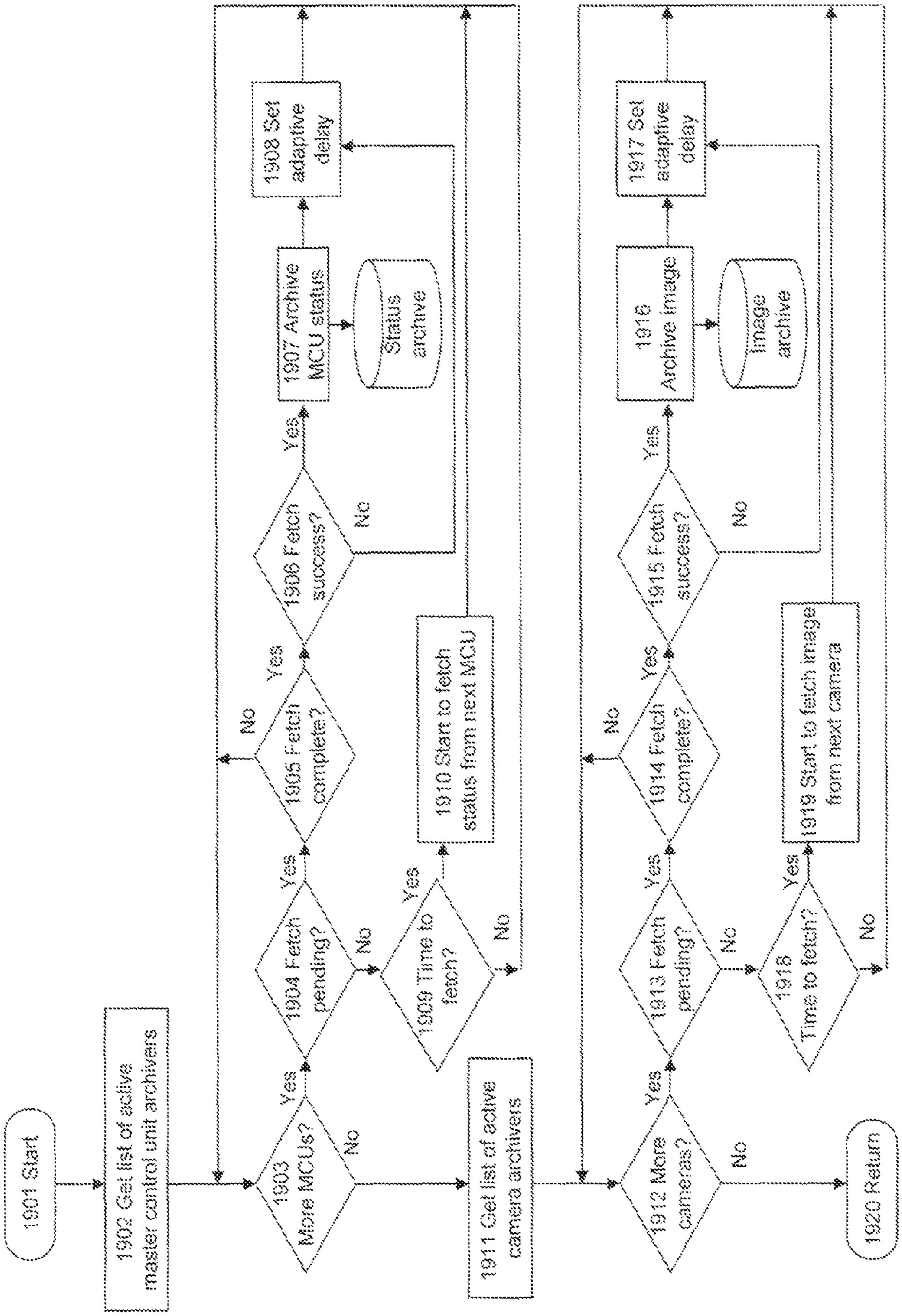
FIG. 19 is a flow diagram of the archiver process of the archiving proxy server software.

FIG. 19 is a flow diagram of the service archiver function, where processing starts 1901 when it is called from the mainline of the APS. The list of MCUs with active archiving is retrieved 1902, and, if there are any further MCUs to process 1903, a check is made to determine whether any status fetches are pending 1904 and, if so, whether the pending fetch has completed 1905. If so, the completion status is accessed to determine if the fetch was successful 1906. If so, the received MCU status message is saved in the archive 1907 and made immediately available for retrieval by network users. Once that processing is complete, the delay until the next status request is calculated 1908, taking into account such factors as baseline sampling rate and current demand for this MCUs status messages from network users. If no fetch is pending, a test is made to determine whether it is time for a new status request 1909, and, if so, a fetch of MCU status is initiated 1910 and a countdown timer started for the completion of that request.

This process iterates until each active MCU archiver has been serviced, at which point the processing moves on to active cameras, where a list of all such active cameras is retrieved 1911. If there are any further cameras to process 1912, a check is made to determine whether a snapshot fetch for that camera is pending 1913 and, if so, whether the pending fetch has completed 1914. If so, the completion status is accessed to determine if the fetch was successful 1915. If so, the received camera image is saved in the archive 1916 and made immediately available for retrieve by network users. Once that processing is complete, the delay until the next status request is calculated 1917, taking into account such factors as baseline sampling rate and current demand for snapshots from this camera from network users and whether it is day or night onsite. If no fetch is pending, a test is made to determine whether it is time for a new snapshot request 1918, and, if so, a fetch of a snapshot is initiated 1919 and a countdown timer started for the completion of that request. This process iterates until each active camera archiver has been serviced, at which point control is returned to the caller 1920.

Figure 20:
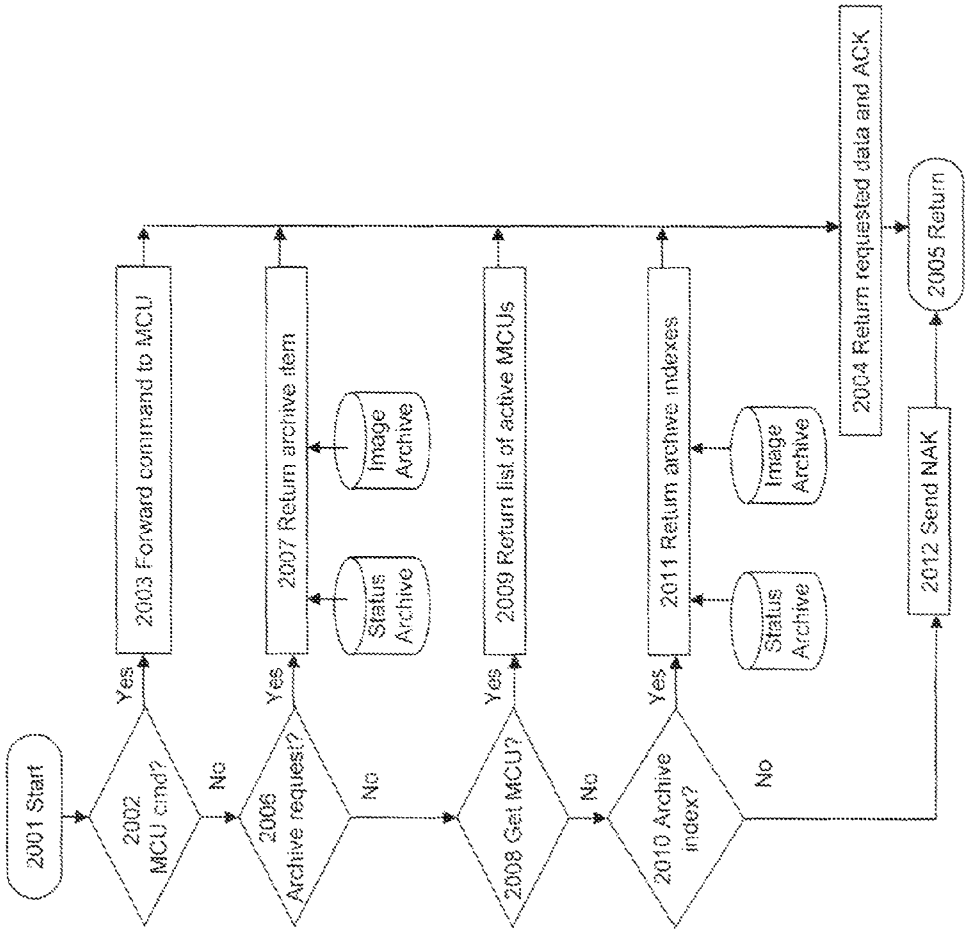
FIG. 20 is a flow diagram of the user command processing of the archiving proxy server software.

FIG. 20) is a flow diagram for the processing of APS commands, where processing begins 2001 when it is called from a thread responding to requests from the network interface. If the command is an MCU command addressed to a specific MCU 2002, as would be the case for proxy mode change requests, for example, then the command is transformed into an MCU command and transmitted to the intended MCU 2003. An acknowledgement is formulated, acknowledging only that the command has been forwarded to the addressed MCU, and is returned to the originator 2004, after which control is returned to the caller 2005. If the command is a request for an archived MCU status message or a snapshot from a camera 2006, the name of the archive is extracted from the request, and the appropriate archive is accessed for the requested information 2007, after which the information is returned to the originator and control returned to the caller.

If the command is a request for a list of active MCUs 2008, then a list of active master control status archivers is completed 2009 and returned to the originator and control returned to the caller. If the command is a request for an archive index 2010, then the requested archiver and day are extracted from the request and a list is constructed of all archive items (MCU status messages or camera images) for the specified day 2011 and returned to the originator, and control is returned to the caller. The returned archive index items include sufficient timing information so as to allow user applications to replay MCU displays. Otherwise, a negative acknowledgment is generated 2012 and returned to the originator, and control is returned to the caller.

Figure 21:
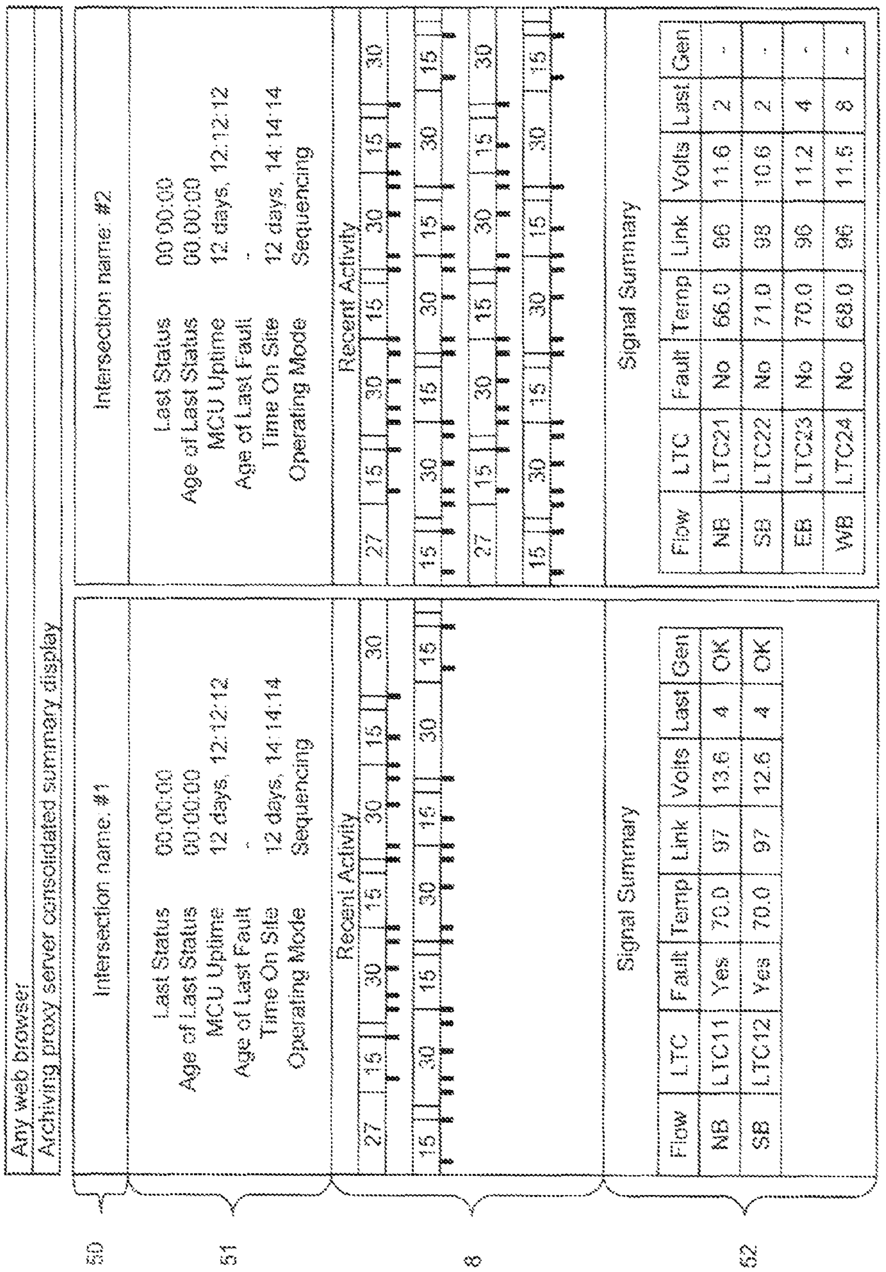
FIG. 21 is a screenshot of the consolidated summary display generated by the archiving proxy server software.

FIG. 21 is a screenshot of an APS consolidated summary application that displays one or more MCU status summaries on a single display, allowing the user to monitor multiple intersections at once. Each panel of the consolidated summary display has a similar format, and there may be a number of such panels in each consolidated summary display. The display panel includes the intersection name 50, a summary of the arrival of the last status message, including its time, age of that time, the time since the MCU's last startup, the age of the last reported MCU fault, the time duration which the MCU has been onsite, and the unit's operating mode 51; the display of recent activity 8 (as described in FIG. 13), and a signal summary table 52 containing status information from each signal under control of the MCU and other information such as flow name, LTC identifier, whether a hardware fault is being reported, the operating temperature, link status, supply voltage, time since the last reported phase change, and the generator control status, if so configured.

FIGS. 22A-C are three different screenshots of examples of the strip charts created by the APS using MCU status messages. FIG. 22A depicts the reported voltages from a single LTC over the course of three days. FIG. 22B depicts the reported temperature for a single LTC over the course of three days. FIG. 22C depicts the radio communication link quality over the course of three days. The APS is capable of generating similar graphs for other parameters and for arbitrary time periods, dependent upon the contents of its status database.

Figure 23:
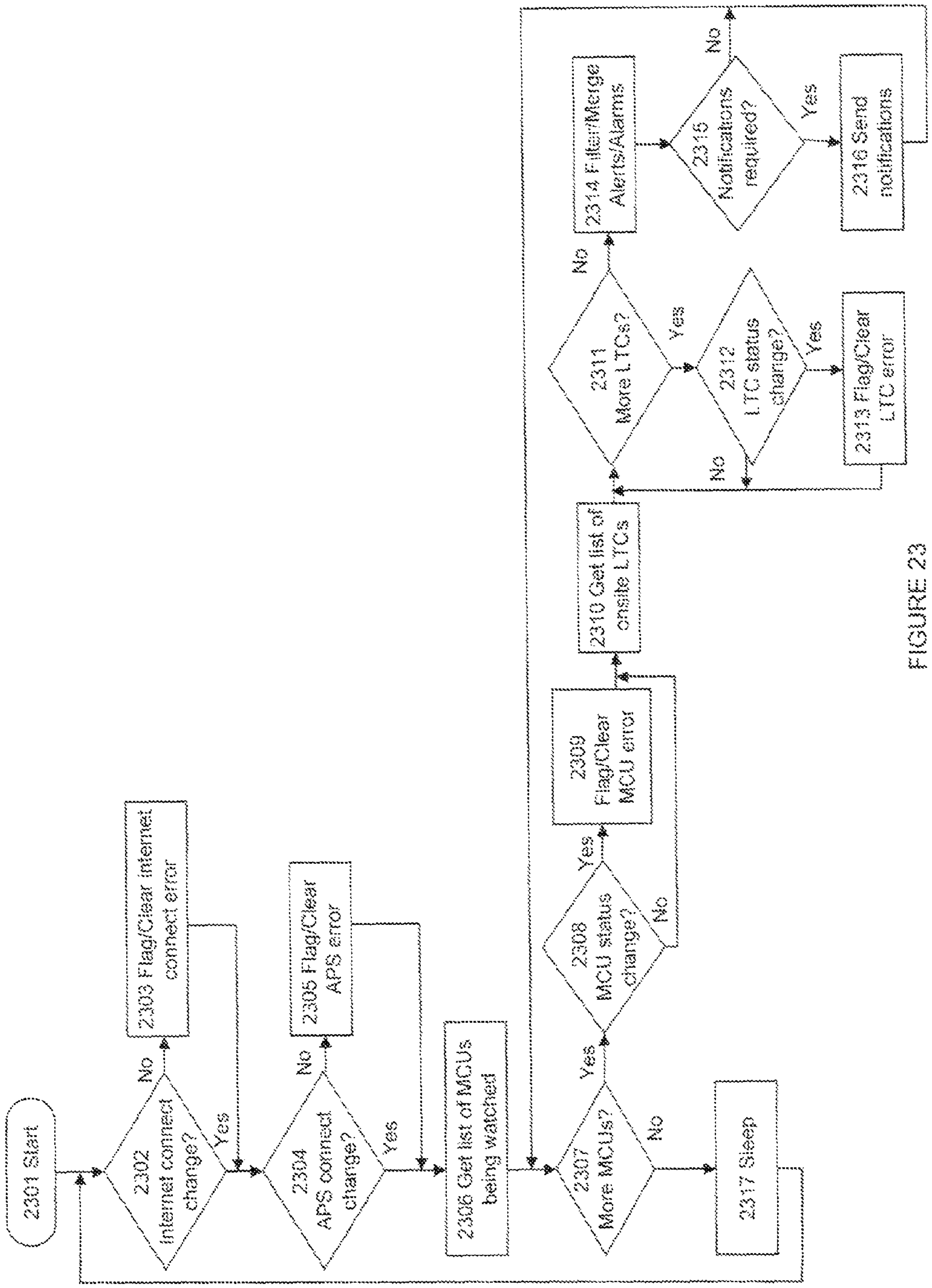
FIG. 23 is a flow diagram of the network watcher application.

FIG. 23 is a flow diagram of the network watcher application running at the NOC. The network watcher is started 2301 at system startup and runs in a loop for as long as the computer is in operation, looking for anomalous conditions and generating alert, alarm, and clear messages as specific system parameters change over time. At the top of the main loop, the network watcher determines 2302 whether its Internet connection status has changed (i.e., is the connection down when it was most recently up or up when it was most recently down). If the status has changed, the Internet connection error status is set or cleared accordingly 2303. The network watcher then determines 2304 whether the connection status of the APS has changed (i.e., is the server not reachable when it most recently was and vice versa).

If the status has changed, the APS connection error status is set or cleared accordingly 2305. The network watcher then gets a list of all MCUs being watched 2306, and for each MCU on the list 2307, the most recent MCU status message is retrieved and compared 2308 with the next most recently received MCU status, several conditions are checked (e.g., MCU program restart, MCU sequencing errors), and any change in status is noted 2309. The list of onsite LTCs and their status messages is then extracted from the MCU status message 2310, and each LTC status message 2311 is examined and the system parameters extracted. Among these system parameters are: supply voltage, operating temperature, radio link quality, and change in location or pointing direction.

The network watcher then checks 2312 if the alert, alarm, or clear thresholds have been crossed between the two most recent status messages for the given LTC, and, if so, the associated error status is updated 2313. Once all of the LTCs in an MCU status message have been examined, any new alerts, alarm, or clear messages are consolidated into a minimum number of messages 2314. The network watcher then compares the pending messages against the list of recently sent messages and, using a set of preconfigured lockout intervals between consecutive messages of the same type, filters out any locked out message. The network watcher then determines if any messages are left to send 2315 and, if so, sends the notifications 2316 via email, SMS text, pager, or any other available communication method. Its processing complete, the watcher the goes to sleep 2317 for a specified period and, upon waking, continues processing at the top of the loop.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A real-time traffic management system comprising:

(a) a main light controller module configured to monitor and control functionality of one or more traffic lights, each traffic light comprising a signal head pointing in a direction;

(b) a master control unit server software application that runs on the main light controller module;

(c) a network operations control module that is in communication with the main light controller module; and (d) a network watcher application program;

wherein the main light controller module is configured to communicate with one or more coordinating light controller modules, onsite personnel, and a network operations center;

wherein the main light controller module uses a camera that detects instances of vehicle demand and provides live images for situational awareness;

wherein the main light controller module comprises a global positioning satellite receiver;

wherein the main light controller module further comprises a light sensor for monitoring ambient lighting conditions; and wherein the network watcher application program continuously scans incoming data, monitors performance of all components in the system, and issues alerts and alarms to notify personnel of events or conditions outside of established tolerances.

2. The real-time traffic management system of claim 1, wherein the main light controller module communicates with the one or more coordinating light controller modules using two or more radios operating on two or more non-overlapping radio frequency bands.

3. The real-time traffic management system of claim 1, wherein the main light controller module further comprises dimmer circuitry for dimming traffic signals based on ambient lighting conditions.

4. The real-time traffic management system of claim 1, wherein the main light controller module further comprises a compass for determining the direction in which the signal head on each traffic signal is pointing.

5. The real-time traffic management system of claim 1, wherein the main light controller module receives commands from and reports status to an archiving proxy server at the network operations center.

6. The real-time traffic management system of claim 5, wherein the archiving proxy server actively requests status and images from the main light controller module, receives responses from the main light controller, and archives the responses for immediate and long-term retrieval.

7. The real-time traffic management system of claim 5, wherein the archiving proxy server responds to status and image requests from authorized administrative users via administrative displays, status and image requests from client users via client displays, and status and image requests from public users via public displays.

8. The real-time traffic management system of claim 5, wherein the archiving proxy server relays commands from authorized users to the main light controller module to provide secure monitor and control access to intersections from any location.

9. The real-time traffic management system of claim 5, further comprising an archiving proxy server consolidated summary application that allows a user to monitor multiple intersections simultaneously.

10. The real-time traffic management system of claim 1, wherein the camera records images for retrieval by an archiving proxy server and authorized users and detects motion events and reports the motion events to the master control unit server software application.

11. The real-time traffic management system of claim 10, wherein the master control unit server software application responds to commands from the archiving proxy server and from authorized remote users.

12. The real-time traffic management system of claim 1, wherein the main light controller module uses timing information derived from a global positioning satellite signal to synchronize flasher mode phase transitions to an atomic clock, thereby synchronizing flasher mode phase transitions of all traffic signals controlled by the main light controller module.

13. The real-time traffic management system of claim 1, wherein the main light controller module has a standard operating mode, a flasher operating mode and a pilot car operating mode.

* * * * *